United States Patent
Menezes et al.

(10) Patent No.: US 9,614,724 B2
(45) Date of Patent: Apr. 4, 2017

(54) SESSION-BASED DEVICE CONFIGURATION

(71) Applicant: Microsoft Technology Licensing, LLC, Redmond, WA (US)

(72) Inventors: Pascal F. Menezes, Bellevue, WA (US); Amer A. Hassan, Kirkland, WA (US); Gunter Leeb, Redmond, WA (US); Todd Haugen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 14/257,502

(22) Filed: Apr. 21, 2014

(65) Prior Publication Data
US 2015/0304165 A1 Oct. 22, 2015

(51) Int. Cl.
*H04L 12/24* (2006.01)
*H04W 76/02* (2009.01)
*H04L 29/08* (2006.01)

(52) U.S. Cl.
CPC ...... *H04L 41/0813* (2013.01); *H04L 41/0806* (2013.01); *H04L 67/14* (2013.01); *H04L 67/34* (2013.01); *H04W 76/02* (2013.01)

(58) Field of Classification Search
CPC ..... H04L 41/0813; H04L 67/34; H04L 67/14; H04L 41/0806; H04W 76/02
USPC ........................ 709/221, 222, 228
See application file for complete search history.

(56) References Cited

U.S. PATENT DOCUMENTS

| | | |
|---|---|---|
| 4,868,653 A | 9/1989 | Golin et al. |
| 5,060,170 A | 10/1991 | Bourgeois |
| 5,149,919 A | 9/1992 | Greanias et al. |
| 5,241,682 A | 8/1993 | Bryant et al. |
| 5,353,133 A | 10/1994 | Bernkopf |
| 5,450,586 A | 9/1995 | Kuzara et al. |
| 5,475,425 A | 12/1995 | Przyborski et al. |
| 5,544,258 A | 8/1996 | Levien |
| 5,687,011 A | 11/1997 | Mowry |
| 5,778,404 A | 7/1998 | Capps et al. |
| 5,831,594 A | 11/1998 | Tognazzini et al. |
| 5,867,709 A | 2/1999 | Klencke |
| 5,903,566 A | 5/1999 | Flammer, III |
| 5,964,879 A | 10/1999 | Dunstan |
| 6,028,960 A | 2/2000 | Graf et al. |
| 6,151,643 A | 11/2000 | Cheng et al. |

(Continued)

FOREIGN PATENT DOCUMENTS

| | | |
|---|---|---|
| CN | 101753404 | 6/2010 |
| EP | 0704655 | 4/1996 |

(Continued)

OTHER PUBLICATIONS

"GPU-Accelerated Route Planning", https://www.cs.unc.edu/cms/research/summaries/GPUAcceleratedRoutePlanning.pdf, Aug. 2005, 2 pages.

(Continued)

*Primary Examiner* — Abdulkader M Alriyashi

(57) ABSTRACT

Techniques for session-based device configuration are described. According to one or more implementations, various settings of a wireless device are configured to optimize device performance while participating in a communication session via a wireless network. The settings, for instance, are configured dynamically and on a per-session basis.

20 Claims, 9 Drawing Sheets

(56) References Cited

U.S. PATENT DOCUMENTS

| | | |
|---|---|---|
| 6,167,377 A | 12/2000 | Gillick et al. |
| 6,185,528 B1 | 2/2001 | Fissore |
| 6,232,972 B1 | 5/2001 | Arcuri et al. |
| 6,263,308 B1 | 7/2001 | Heckerman et al. |
| 6,282,709 B1 | 8/2001 | Reha et al. |
| 6,283,858 B1 | 9/2001 | Hayes et al. |
| 6,297,825 B1 | 10/2001 | Madden et al. |
| 6,339,437 B1 | 1/2002 | Nielsen |
| 6,349,406 B1 | 2/2002 | Levine et al. |
| 6,389,181 B2 | 5/2002 | Shaffer et al. |
| 6,452,597 B1 | 9/2002 | Goldberg et al. |
| 6,603,491 B2 | 8/2003 | Lemelson et al. |
| 6,757,027 B1 | 6/2004 | Edwards et al. |
| 6,847,386 B2 | 1/2005 | Paleiov |
| 6,854,073 B2 | 2/2005 | Bates et al. |
| 6,879,709 B2 | 4/2005 | Tian et al. |
| 6,934,370 B1 | 8/2005 | Leban et al. |
| 6,970,947 B2 | 11/2005 | Ebling et al. |
| 7,082,211 B2 | 7/2006 | Simon et al. |
| 7,146,296 B1 | 12/2006 | Carlbom et al. |
| 7,171,432 B2 | 1/2007 | Wildhahen |
| 7,194,114 B2 | 3/2007 | Schneiderman |
| 7,200,561 B2 | 4/2007 | Moriya et al. |
| 7,251,812 B1 | 7/2007 | Jhanwar et al. |
| 7,254,257 B2 | 8/2007 | Kim et al. |
| 7,337,112 B2 | 2/2008 | Moriya et al. |
| 7,370,043 B1 | 5/2008 | Shelton et al. |
| 7,380,003 B1 | 5/2008 | Guo et al. |
| 7,387,539 B2 | 6/2008 | Trenne |
| 7,400,439 B2 | 7/2008 | Holman |
| 7,443,791 B2 | 10/2008 | Barrett et al. |
| 7,443,807 B2 | 10/2008 | Cutler |
| 7,458,825 B2 | 12/2008 | Atsmon et al. |
| 7,466,986 B2 | 12/2008 | Halcrow et al. |
| 7,496,910 B2 | 2/2009 | Voskuil |
| 7,525,928 B2 | 4/2009 | Cutler |
| 7,551,754 B2 | 6/2009 | Steinberg et al. |
| 7,577,295 B2 | 8/2009 | Constantin et al. |
| 7,577,297 B2 | 8/2009 | Mori et al. |
| 7,580,952 B2 | 8/2009 | Logan et al. |
| 7,584,285 B2 | 9/2009 | Hudson et al. |
| 7,606,375 B2 | 10/2009 | Bailey et al. |
| 7,614,046 B2 | 11/2009 | Daniels et al. |
| 7,639,877 B2 | 12/2009 | Shiota et al. |
| 7,680,327 B2 | 3/2010 | Weiss |
| 7,697,557 B2 | 4/2010 | Segel |
| 7,703,036 B2 | 4/2010 | Satterfield |
| 7,715,598 B2 | 5/2010 | Li et al. |
| 7,716,643 B2 | 5/2010 | Goldin |
| 7,729,902 B1 | 6/2010 | Gupta |
| 7,738,870 B2 | 6/2010 | Howard |
| 7,751,599 B2 | 7/2010 | Chen et al. |
| 7,756,538 B2 | 7/2010 | Bonta et al. |
| 7,765,194 B1 | 7/2010 | Sharma et al. |
| 7,766,498 B2 | 8/2010 | Sampsell |
| 7,779,367 B2 | 8/2010 | Oshiro et al. |
| 7,783,629 B2 | 8/2010 | Li et al. |
| 7,783,777 B1 | 8/2010 | Pabla et al. |
| 7,835,910 B1 | 11/2010 | Hakkani-Tur et al. |
| 7,864,967 B2 | 1/2011 | Takeuchi et al. |
| 7,865,952 B1 | 1/2011 | Hopwood et al. |
| 7,881,479 B2 | 2/2011 | Asada |
| 7,900,011 B2 | 3/2011 | Amundsen et al. |
| 7,959,308 B2 | 6/2011 | Freeman et al. |
| 7,970,350 B2 | 6/2011 | Sheynman et al. |
| 7,970,901 B2 | 6/2011 | Lipscomb et al. |
| 7,978,925 B1 | 7/2011 | Souchard |
| 8,015,006 B2 | 9/2011 | Kennewick et al. |
| 8,026,830 B2 | 9/2011 | Womble et al. |
| 8,074,213 B1 | 12/2011 | Holtz |
| 8,078,623 B2 | 12/2011 | Chou et al. |
| 8,091,074 B2 | 1/2012 | Lyon-Smith |
| 8,107,243 B2 | 1/2012 | Guccione et al. |
| 8,150,098 B2 | 4/2012 | Gallagher et al. |
| 8,154,384 B2 | 4/2012 | Hirai |
| 8,155,400 B2 | 4/2012 | Bronstein et al. |
| 8,165,352 B1 | 4/2012 | Mohanty |
| 8,170,298 B2 | 5/2012 | Li et al. |
| 8,189,807 B2 | 5/2012 | Cutler |
| 8,194,177 B2 | 6/2012 | Jung et al. |
| 8,212,294 B2 | 7/2012 | Hoke |
| 8,212,894 B2 | 7/2012 | Nozaki et al. |
| 8,213,333 B2 | 7/2012 | Greel et al. |
| 8,213,690 B2 | 7/2012 | Okada et al. |
| 8,224,036 B2 | 7/2012 | Maruyama et al. |
| 8,229,729 B2 | 7/2012 | Sarikaya et al. |
| 8,232,962 B2 | 7/2012 | Buck |
| 8,239,446 B2 | 8/2012 | Navar et al. |
| 8,245,043 B2 | 8/2012 | Cutler |
| 8,275,615 B2 | 9/2012 | Kozat |
| 8,296,107 B2 | 10/2012 | Turner et al. |
| 8,296,673 B2 | 10/2012 | Lipstein et al. |
| 8,302,006 B2 | 10/2012 | Stanek et al. |
| 8,306,280 B2 | 11/2012 | Nozaki et al. |
| 8,321,220 B1 | 11/2012 | Chotimongkol et al. |
| 8,326,634 B2 | 12/2012 | Di Cristo et al. |
| 8,331,632 B1 | 12/2012 | Mohanty et al. |
| 8,345,934 B2 | 1/2013 | Obrador et al. |
| 8,346,563 B1 | 1/2013 | Hjelm et al. |
| 8,358,811 B2 | 1/2013 | Adams et al. |
| 8,364,717 B2 | 1/2013 | Delling et al. |
| 8,368,540 B2 | 2/2013 | Perkins et al. |
| 8,373,829 B2 | 2/2013 | Hara et al. |
| 8,374,122 B2 | 2/2013 | Meier et al. |
| 8,384,694 B2 | 2/2013 | Powell et al. |
| 8,384,791 B2 | 2/2013 | Porter et al. |
| 8,392,594 B2 | 3/2013 | Georgis et al. |
| 8,397,163 B1 | 3/2013 | Sran |
| 8,400,332 B2 | 3/2013 | Szwabowski et al. |
| 8,406,206 B2 | 3/2013 | Chiang |
| 8,410,903 B2 | 4/2013 | Hirai |
| 8,412,521 B2 | 4/2013 | Mathias et al. |
| 8,413,198 B2 | 4/2013 | Connor et al. |
| 8,448,847 B2 | 5/2013 | Lee |
| 8,468,548 B2 | 6/2013 | Kulkarni et al. |
| 8,484,314 B2 | 7/2013 | Luna et al. |
| 8,504,823 B2 | 8/2013 | Carpenter |
| 8,516,471 B2 | 8/2013 | Bhakta et al. |
| 8,522,209 B2 | 8/2013 | Wintergerst et al. |
| 8,526,683 B2 | 9/2013 | Maruyama et al. |
| 8,527,602 B1 | 9/2013 | Rasmussen et al. |
| 8,532,347 B2 | 9/2013 | Bourdev |
| 8,535,075 B1 | 9/2013 | Golko et al. |
| 8,538,091 B2 | 9/2013 | Kaneda et al. |
| 8,539,477 B2 | 9/2013 | Balascio et al. |
| 8,555,364 B2 | 10/2013 | Filippi et al. |
| 8,559,722 B2 | 10/2013 | Tsuji |
| 8,571,866 B2 | 10/2013 | Melamed et al. |
| 8,611,678 B2 | 12/2013 | Hanson et al. |
| 8,614,734 B2 | 12/2013 | Cutler |
| 8,619,062 B2 | 12/2013 | Powell et al. |
| 8,620,351 B2 | 12/2013 | Karaoguz |
| 8,620,649 B2 | 12/2013 | Gao |
| 8,626,932 B2 | 1/2014 | Lydon et al. |
| 8,631,350 B2 | 1/2014 | Lepage et al. |
| 8,670,850 B2 | 3/2014 | Soulodre |
| 8,686,600 B2 | 4/2014 | Terlizzi et al. |
| 8,701,102 B2 | 4/2014 | Appiah et al. |
| 8,705,806 B2 | 4/2014 | Nakano |
| 8,719,603 B2 | 5/2014 | Belesiu |
| 8,761,512 B1 | 6/2014 | Buddemeier |
| 8,776,166 B1 | 7/2014 | Erickson et al. |
| 8,924,315 B2 | 12/2014 | Archambeau |
| 8,935,673 B1 | 1/2015 | Ashkenazi et al. |
| 9,239,773 B1 | 1/2016 | Teplitsky et al. |
| 9,324,323 B1 | 4/2016 | Bikel et al. |
| 9,460,493 B2 | 10/2016 | Suri et al. |
| 9,510,125 B2 | 11/2016 | Raghuvanshi et al. |
| 2001/0000356 A1 | 4/2001 | Woods |
| 2002/0041590 A1* | 4/2002 | Donovan ............ H04L 12/5695 370/352 |
| 2002/0083041 A1 | 6/2002 | Achlioptas |
| 2002/0101918 A1 | 8/2002 | Rodman et al. |
| 2002/0116171 A1 | 8/2002 | Russell |

(56) References Cited

U.S. PATENT DOCUMENTS

| | | |
|---|---|---|
| 2002/0143855 A1 | 10/2002 | Traversat et al. |
| 2003/0064142 A1 | 4/2003 | Wagner et al. |
| 2003/0068100 A1 | 4/2003 | Covell et al. |
| 2003/0125948 A1 | 7/2003 | Lyudovyk |
| 2003/0182414 A1 | 9/2003 | O'Neill |
| 2003/0212543 A1 | 11/2003 | Epstein |
| 2003/0212544 A1 | 11/2003 | Acero |
| 2004/0040021 A1 | 2/2004 | Bharati et al. |
| 2004/0088726 A1 | 5/2004 | Ma et al. |
| 2004/0168165 A1 | 8/2004 | Kokkinen |
| 2004/0210752 A1 | 10/2004 | Rao |
| 2004/0240711 A1 | 12/2004 | Hamza et al. |
| 2005/0039169 A1 | 2/2005 | Hsu et al. |
| 2005/0052427 A1 | 3/2005 | Wu et al. |
| 2005/0058297 A1 | 3/2005 | Jot et al. |
| 2005/0065789 A1 | 3/2005 | Yacoub |
| 2005/0091057 A1 | 4/2005 | Phillips et al. |
| 2005/0114625 A1 | 5/2005 | Snyder |
| 2005/0144013 A1 | 6/2005 | Fujimoto et al. |
| 2005/0144616 A1 | 6/2005 | Hammond et al. |
| 2005/0163372 A1 | 7/2005 | Kida et al. |
| 2005/0165598 A1 | 7/2005 | Cote et al. |
| 2005/0165839 A1 | 7/2005 | Madan et al. |
| 2005/0177515 A1 | 8/2005 | Kalavade et al. |
| 2005/0177624 A1 | 8/2005 | Oswald et al. |
| 2005/0245243 A1 | 11/2005 | Zuniga |
| 2006/0009996 A1 | 1/2006 | Lipscomb et al. |
| 2006/0034542 A1 | 2/2006 | Aoyama |
| 2006/0036965 A1 | 2/2006 | Harris et al. |
| 2006/0046709 A1 | 3/2006 | Krumm et al. |
| 2006/0058009 A1 | 3/2006 | Vogedes et al. |
| 2006/0088209 A1 | 4/2006 | Yu et al. |
| 2006/0156222 A1 | 7/2006 | Chi et al. |
| 2006/0200477 A1 | 9/2006 | Barrenechea |
| 2006/0212867 A1 | 9/2006 | Fields et al. |
| 2006/0218302 A1* | 9/2006 | Chia ................. H04L 47/10 709/245 |
| 2006/0244845 A1 | 11/2006 | Craig et al. |
| 2006/0250834 A1 | 11/2006 | Chinn et al. |
| 2006/0253491 A1 | 11/2006 | Gokturk |
| 2006/0277478 A1 | 12/2006 | Seraji et al. |
| 2006/0280341 A1 | 12/2006 | Koshizen |
| 2006/0287856 A1 | 12/2006 | He et al. |
| 2006/0290705 A1 | 12/2006 | White |
| 2007/0002478 A1 | 1/2007 | Mowry |
| 2007/0038436 A1 | 2/2007 | Cristo et al. |
| 2007/0053607 A1 | 3/2007 | Mitsunaga |
| 2007/0055752 A1 | 3/2007 | Wiegand et al. |
| 2007/0055936 A1 | 3/2007 | Dhanjal et al. |
| 2007/0058878 A1 | 3/2007 | Gomila et al. |
| 2007/0074168 A1 | 3/2007 | Bates et al. |
| 2007/0128979 A1 | 6/2007 | Shackelford |
| 2007/0147318 A1 | 6/2007 | Ross et al. |
| 2007/0150428 A1 | 6/2007 | Webb |
| 2007/0156392 A1 | 7/2007 | Balchandran et al. |
| 2007/0157313 A1 | 7/2007 | Denton |
| 2007/0172099 A1 | 7/2007 | Park |
| 2007/0188477 A1 | 8/2007 | Rehm |
| 2007/0198950 A1 | 8/2007 | Dodge et al. |
| 2007/0203863 A1 | 8/2007 | Gupta |
| 2007/0226649 A1 | 9/2007 | Agmon |
| 2007/0233879 A1 | 10/2007 | Woods |
| 2007/0234048 A1 | 10/2007 | Ziv |
| 2007/0271086 A1 | 11/2007 | Peters et al. |
| 2007/0294061 A1 | 12/2007 | Carlbom et al. |
| 2008/0004877 A1 | 1/2008 | Tian |
| 2008/0005114 A1 | 1/2008 | Li |
| 2008/0014563 A1 | 1/2008 | Visani |
| 2008/0037438 A1 | 2/2008 | Twiss et al. |
| 2008/0037442 A1 | 2/2008 | Bill |
| 2008/0046425 A1 | 2/2008 | Perski |
| 2008/0055278 A1 | 3/2008 | Locker et al. |
| 2008/0069364 A1 | 3/2008 | Itou et al. |
| 2008/0089299 A1 | 4/2008 | Lindsley et al. |
| 2008/0089561 A1 | 4/2008 | Zhang |
| 2008/0137875 A1 | 6/2008 | Zong et al. |
| 2008/0140981 A1* | 6/2008 | Kim ..................... G06F 9/54 711/171 |
| 2008/0143674 A1 | 6/2008 | Molander et al. |
| 2008/0159232 A1 | 7/2008 | Thalanany et al. |
| 2008/0165701 A1 | 7/2008 | Ananthanarayanan et al. |
| 2008/0175190 A1 | 7/2008 | Lee et al. |
| 2008/0183751 A1 | 7/2008 | Cazier et al. |
| 2008/0192820 A1 | 8/2008 | Brooks et al. |
| 2008/0195388 A1 | 8/2008 | Bower et al. |
| 2008/0204598 A1 | 8/2008 | Maurer et al. |
| 2008/0209354 A1 | 8/2008 | Stanek et al. |
| 2008/0212894 A1 | 9/2008 | Demirli et al. |
| 2008/0215183 A1 | 9/2008 | Chen |
| 2008/0235017 A1 | 9/2008 | Satomura |
| 2008/0263130 A1 | 10/2008 | Michalowitz et al. |
| 2008/0273708 A1 | 11/2008 | Sandgren et al. |
| 2009/0028380 A1 | 1/2009 | Hillebrand et al. |
| 2009/0030697 A1 | 1/2009 | Cerra et al. |
| 2009/0046864 A1 | 2/2009 | Mahabub et al. |
| 2009/0055389 A1 | 2/2009 | Schilit et al. |
| 2009/0055461 A1 | 2/2009 | Georgis et al. |
| 2009/0083148 A1 | 3/2009 | Hwang et al. |
| 2009/0087099 A1 | 4/2009 | Nakamura |
| 2009/0089801 A1 | 4/2009 | Jones et al. |
| 2009/0100384 A1 | 4/2009 | Louch |
| 2009/0100459 A1 | 4/2009 | Riedl et al. |
| 2009/0100489 A1 | 4/2009 | Strothmann |
| 2009/0116749 A1 | 5/2009 | Cristinacce et al. |
| 2009/0180671 A1 | 7/2009 | Lee |
| 2009/0185723 A1 | 7/2009 | Kurtz |
| 2009/0187593 A1 | 7/2009 | Chen et al. |
| 2009/0210328 A1 | 8/2009 | Fomenko et al. |
| 2009/0228820 A1 | 9/2009 | Kim et al. |
| 2009/0259667 A1 | 10/2009 | Wang et al. |
| 2009/0271735 A1 | 10/2009 | Anderson et al. |
| 2009/0292687 A1 | 11/2009 | Fan |
| 2009/0300596 A1 | 12/2009 | Tyhurst et al. |
| 2009/0313546 A1 | 12/2009 | Katpelly et al. |
| 2010/0004930 A1 | 1/2010 | Strope |
| 2010/0011123 A1 | 1/2010 | Dantzig et al. |
| 2010/0023625 A1* | 1/2010 | Lee ..................... H04L 12/403 709/227 |
| 2010/0027663 A1 | 2/2010 | Dai et al. |
| 2010/0054544 A1 | 3/2010 | Arguelles |
| 2010/0082478 A1 | 4/2010 | Van Der Veen et al. |
| 2010/0103117 A1 | 4/2010 | Townsend et al. |
| 2010/0111059 A1 | 5/2010 | Bappu et al. |
| 2010/0114890 A1 | 5/2010 | Hagar |
| 2010/0128863 A1 | 5/2010 | Krum et al. |
| 2010/0135038 A1 | 6/2010 | Handschy et al. |
| 2010/0189313 A1 | 7/2010 | Prokoski |
| 2010/0191837 A1* | 7/2010 | Linden ............... H04L 41/0806 709/220 |
| 2010/0205177 A1 | 8/2010 | Sato |
| 2010/0211695 A1 | 8/2010 | Steinmetz et al. |
| 2010/0211908 A1 | 8/2010 | Luk et al. |
| 2010/0229222 A1 | 9/2010 | Li et al. |
| 2010/0251206 A1 | 9/2010 | Horiuchi et al. |
| 2010/0251230 A1 | 9/2010 | O'Farrell et al. |
| 2010/0279653 A1* | 11/2010 | Poltorak ............... H04M 15/00 455/410 |
| 2010/0295774 A1 | 11/2010 | Hennessey |
| 2010/0312546 A1 | 12/2010 | Chang et al. |
| 2011/0007174 A1 | 1/2011 | Bacivarov et al. |
| 2011/0009075 A1 | 1/2011 | Jantunen et al. |
| 2011/0010171 A1 | 1/2011 | Talwar et al. |
| 2011/0010319 A1 | 1/2011 | Harada |
| 2011/0010424 A1 | 1/2011 | Fox et al. |
| 2011/0016333 A1 | 1/2011 | Scott et al. |
| 2011/0043490 A1 | 2/2011 | Powell et al. |
| 2011/0052081 A1 | 3/2011 | Onoe et al. |
| 2011/0064331 A1 | 3/2011 | Andres Del Valle |
| 2011/0071841 A1 | 3/2011 | Fomenko et al. |
| 2011/0081023 A1 | 4/2011 | Raghuvanshi et al. |
| 2011/0091113 A1 | 4/2011 | Ito |
| 2011/0093459 A1 | 4/2011 | Dong et al. |
| 2011/0099538 A1 | 4/2011 | Naidu Pujala et al. |
| 2011/0129159 A1 | 6/2011 | Cifarelli |

(56) References Cited

U.S. PATENT DOCUMENTS

| | | |
|---|---|---|
| 2011/0135166 A1 | 6/2011 | Wechsler |
| 2011/0138064 A1 | 6/2011 | Rieger et al. |
| 2011/0144999 A1 | 6/2011 | Jang et al. |
| 2011/0153324 A1 | 6/2011 | Ballinger et al. |
| 2011/0158536 A1 | 6/2011 | Nakano |
| 2011/0173556 A1 | 7/2011 | Czerwinski et al. |
| 2011/0176058 A1 | 7/2011 | Biswas et al. |
| 2011/0177481 A1 | 7/2011 | Haff et al. |
| 2011/0179182 A1 | 7/2011 | Vadia et al. |
| 2011/0283266 A1 | 11/2011 | Gallagher et al. |
| 2011/0289482 A1 | 11/2011 | Bentlye |
| 2011/0321029 A1 | 12/2011 | Kern et al. |
| 2012/0014560 A1 | 1/2012 | Obrador et al. |
| 2012/0027311 A1 | 2/2012 | Cok |
| 2012/0029661 A1 | 2/2012 | Jones et al. |
| 2012/0030325 A1 | 2/2012 | Silverman et al. |
| 2012/0030682 A1 | 2/2012 | Shaffer et al. |
| 2012/0054624 A1 | 3/2012 | Owens et al. |
| 2012/0065976 A1 | 3/2012 | Deng |
| 2012/0066642 A1 | 3/2012 | Shi |
| 2012/0071174 A1 | 3/2012 | Bao et al. |
| 2012/0072528 A1 | 3/2012 | Rimac et al. |
| 2012/0076427 A1 | 3/2012 | Hibino et al. |
| 2012/0079372 A1 | 3/2012 | Kandekar et al. |
| 2012/0084086 A1 | 4/2012 | Gilbert |
| 2012/0096121 A1 | 4/2012 | Hao et al. |
| 2012/0106859 A1 | 5/2012 | Cheatle |
| 2012/0120678 A1 | 5/2012 | Su |
| 2012/0134139 A1 | 5/2012 | Jang et al. |
| 2012/0144288 A1 | 6/2012 | Caruso et al. |
| 2012/0169791 A1 | 7/2012 | Whitehead et al. |
| 2012/0188382 A1 | 7/2012 | Morrison et al. |
| 2012/0224388 A1 | 9/2012 | Lin |
| 2012/0225652 A1 | 9/2012 | Martinez et al. |
| 2012/0232885 A1 | 9/2012 | Barbosa et al. |
| 2012/0235887 A1 | 9/2012 | Border et al. |
| 2012/0242598 A1 | 9/2012 | Won et al. |
| 2012/0245944 A1 | 9/2012 | Gruber |
| 2012/0246458 A1 | 9/2012 | Jain et al. |
| 2012/0253799 A1 | 10/2012 | Bangalore |
| 2012/0253802 A1 | 10/2012 | Heck et al. |
| 2012/0254086 A1 | 10/2012 | Deng |
| 2012/0254161 A1 | 10/2012 | Zhang et al. |
| 2012/0254227 A1 | 10/2012 | Heck et al. |
| 2012/0256967 A1 | 10/2012 | Baldwin et al. |
| 2012/0265531 A1 | 10/2012 | Bennett |
| 2012/0266140 A1 | 10/2012 | Bates |
| 2012/0269355 A1 | 10/2012 | Chandak et al. |
| 2012/0271617 A1 | 10/2012 | Nakajima et al. |
| 2012/0278430 A1 | 11/2012 | Lehane et al. |
| 2012/0290293 A1 | 11/2012 | Hakkani-Tur et al. |
| 2012/0293543 A1 | 11/2012 | Jardine-Skinner |
| 2012/0303565 A1 | 11/2012 | Deng et al. |
| 2012/0308124 A1 | 12/2012 | Belhumeur et al. |
| 2012/0310523 A1 | 12/2012 | Delling et al. |
| 2012/0313865 A1 | 12/2012 | Pearce |
| 2012/0317197 A1 | 12/2012 | De Foy et al. |
| 2012/0324069 A1 | 12/2012 | Nori et al. |
| 2012/0327040 A1 | 12/2012 | Simon et al. |
| 2012/0327042 A1 | 12/2012 | Harley et al. |
| 2012/0331102 A1 | 12/2012 | Ertugrul |
| 2012/0331111 A1 | 12/2012 | Wu et al. |
| 2013/0013936 A1 | 1/2013 | Lin et al. |
| 2013/0014050 A1 | 1/2013 | Queru |
| 2013/0016055 A1 | 1/2013 | Chuang |
| 2013/0019175 A1 | 1/2013 | Kotler et al. |
| 2013/0021373 A1 | 1/2013 | Vaught et al. |
| 2013/0031476 A1 | 1/2013 | Coin et al. |
| 2013/0065576 A1 | 3/2013 | Basir |
| 2013/0073725 A1 | 3/2013 | Bordeleau et al. |
| 2013/0078869 A1 | 3/2013 | Golko et al. |
| 2013/0085756 A1 | 4/2013 | Chotimongkol et al. |
| 2013/0086461 A1 | 4/2013 | Ashley-Rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler |
| 2013/0091465 A1 | 4/2013 | Kikin-Gil et al. |
| 2013/0091534 A1 | 4/2013 | Gilde et al. |
| 2013/0094445 A1 | 4/2013 | De Foy et al. |
| 2013/0097481 A1 | 4/2013 | Kotler et al. |
| 2013/0097490 A1 | 4/2013 | Kotler et al. |
| 2013/0106725 A1 | 5/2013 | Bakken et al. |
| 2013/0106740 A1 | 5/2013 | Yilmaz et al. |
| 2013/0106977 A1 | 5/2013 | Chu et al. |
| 2013/0108065 A1 | 5/2013 | Mullins et al. |
| 2013/0117658 A1 | 5/2013 | Fidler et al. |
| 2013/0127982 A1 | 5/2013 | Zhang et al. |
| 2013/0128364 A1 | 5/2013 | Wheeler et al. |
| 2013/0138436 A1 | 5/2013 | Yu |
| 2013/0148864 A1 | 6/2013 | Dolson et al. |
| 2013/0151441 A1 | 6/2013 | Archambeau |
| 2013/0151681 A1 | 6/2013 | Dournov et al. |
| 2013/0151975 A1 | 6/2013 | Shadi et al. |
| 2013/0152092 A1 | 6/2013 | Yadgar |
| 2013/0156275 A1 | 6/2013 | Amacker et al. |
| 2013/0166742 A1 | 6/2013 | Wiener et al. |
| 2013/0173604 A1 | 7/2013 | Li et al. |
| 2013/0174047 A1 | 7/2013 | Sivakumar et al. |
| 2013/0185065 A1 | 7/2013 | Tzirkel-Hancock et al. |
| 2013/0188032 A1 | 7/2013 | Vertegaal |
| 2013/0191781 A1 | 7/2013 | Radakovitz et al. |
| 2013/0212484 A1 | 8/2013 | Joshi et al. |
| 2013/0217414 A1 | 8/2013 | Nagaraj |
| 2013/0226587 A1 | 8/2013 | Cheung |
| 2013/0227398 A1 | 8/2013 | Bolstad |
| 2013/0227415 A1 | 8/2013 | Gregg et al. |
| 2013/0231130 A1 | 9/2013 | Cherian et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0242964 A1 | 9/2013 | Hassan et al. |
| 2013/0243328 A1 | 9/2013 | Irie |
| 2013/0252636 A1 | 9/2013 | Chang et al. |
| 2013/0254412 A1 | 9/2013 | Menezes et al. |
| 2013/0266196 A1 | 10/2013 | Kono |
| 2013/0275779 A1 | 10/2013 | He |
| 2013/0293530 A1 | 11/2013 | Perez et al. |
| 2013/0297700 A1 | 11/2013 | Hayton et al. |
| 2013/0298185 A1 | 11/2013 | Koneru et al. |
| 2013/0315235 A1 | 11/2013 | Foo |
| 2013/0318249 A1 | 11/2013 | McDonough et al. |
| 2013/0321390 A1 | 12/2013 | Latta et al. |
| 2013/0325148 A1 | 12/2013 | Mustafa et al. |
| 2013/0335301 A1 | 12/2013 | Wong et al. |
| 2013/0339478 A1 | 12/2013 | Edge |
| 2013/0342637 A1 | 12/2013 | Felkai et al. |
| 2014/0004741 A1 | 1/2014 | Jol et al. |
| 2014/0006420 A1 | 1/2014 | Sparrow et al. |
| 2014/0007215 A1 | 1/2014 | Romano et al. |
| 2014/0019626 A1 | 1/2014 | Hubler et al. |
| 2014/0019896 A1 | 1/2014 | Satterfield |
| 2014/0025380 A1 | 1/2014 | Koch et al. |
| 2014/0029859 A1 | 1/2014 | Libin |
| 2014/0046914 A1 | 2/2014 | Das et al. |
| 2014/0050419 A1 | 2/2014 | Lerios et al. |
| 2014/0072242 A1 | 3/2014 | Wei et al. |
| 2014/0098682 A1* | 4/2014 | Cao .................. H04W 36/0083 370/252 |
| 2014/0107921 A1 | 4/2014 | Delling et al. |
| 2014/0108979 A1 | 4/2014 | Davidson et al. |
| 2014/0157169 A1 | 6/2014 | Kikin-gil |
| 2014/0173602 A1 | 6/2014 | Kikin-gil et al. |
| 2014/0181708 A1 | 6/2014 | Kikin-gil et al. |
| 2014/0210797 A1 | 7/2014 | Kreek et al. |
| 2014/0214410 A1 | 7/2014 | Jang |
| 2014/0223334 A1 | 8/2014 | Jensen |
| 2014/0253522 A1 | 9/2014 | Cueto |
| 2014/0257803 A1 | 9/2014 | Yu et al. |
| 2014/0282415 A1 | 9/2014 | Ovadia et al. |
| 2014/0317602 A1 | 10/2014 | Zuo |
| 2014/0341443 A1 | 11/2014 | Cao |
| 2014/0358537 A1 | 12/2014 | Gilbert |
| 2014/0359593 A1 | 12/2014 | Cohen et al. |

(56) References Cited

U.S. PATENT DOCUMENTS

| | | |
|---|---|---|
| 2014/0359709 A1 | 12/2014 | Nassar |
| 2014/0372112 A1 | 12/2014 | Xue et al. |
| 2014/0379326 A1 | 12/2014 | Sarikaya et al. |
| 2014/0379353 A1 | 12/2014 | Boies et al. |
| 2015/0082291 A1 | 3/2015 | Thomas et al. |
| 2015/0082292 A1 | 3/2015 | Thomas et al. |
| 2015/0082293 A1 | 3/2015 | Thomas et al. |
| 2015/0082296 A1 | 3/2015 | Thomas et al. |
| 2015/0100312 A1 | 4/2015 | Bocchieri |
| 2015/0161993 A1 | 6/2015 | Sainath |
| 2015/0161994 A1 | 6/2015 | Tang |
| 2015/0170020 A1 | 6/2015 | Garimella |
| 2015/0255061 A1 | 9/2015 | Xue et al. |
| 2015/0255069 A1 | 9/2015 | Adams et al. |
| 2015/0277682 A1 | 10/2015 | Kaufthal |
| 2015/0277708 A1 | 10/2015 | Rodrig et al. |
| 2015/0278191 A1 | 10/2015 | Levit et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317510 A1 | 11/2015 | Lee |
| 2015/0325236 A1 | 11/2015 | Levit |
| 2015/0331240 A1 | 11/2015 | Poulos |
| 2015/0347120 A1 | 12/2015 | Garg et al. |
| 2015/0347274 A1 | 12/2015 | Taylor |
| 2015/0347734 A1 | 12/2015 | Beigi |
| 2015/0350333 A1 | 12/2015 | Cutler et al. |
| 2015/0356759 A1 | 12/2015 | Delling et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0373546 A1 | 12/2015 | Haugen et al. |
| 2015/0378515 A1 | 12/2015 | Powell |
| 2016/0203125 A1 | 7/2016 | Sarikaya et al. |
| 2016/0210035 A1 | 7/2016 | Rodrig et al. |
| 2016/0239987 A1 | 8/2016 | Negrila et al. |
| 2016/0379343 A1 | 12/2016 | Suri et al. |

FOREIGN PATENT DOCUMENTS

| | | |
|---|---|---|
| EP | 0553101 | 7/1997 |
| EP | 0816981 | 7/1998 |
| EP | 1055872 | 11/2000 |
| EP | 1174787 | 1/2002 |
| EP | 1331566 | 7/2003 |
| EP | 1628197 | 2/2006 |
| EP | 1965389 | 9/2008 |
| EP | 1970803 | 9/2008 |
| EP | 2096577 | 9/2009 |
| EP | 2267655 | 12/2010 |
| EP | 2312462 | 4/2011 |
| EP | 2482572 | 8/2012 |
| EP | 2575128 | 4/2013 |
| GB | 2431001 | 4/2007 |
| JP | 2002091477 | 3/2002 |
| KR | 20040076079 | 8/2004 |
| KR | 20130022513 | 3/2013 |
| WO | WO-9304468 | 3/1993 |
| WO | WO-0250590 | 6/2002 |
| WO | WO-2005013262 | 2/2005 |
| WO | WO-2005033934 | 4/2005 |
| WO | WO-2008124181 | 10/2008 |
| WO | WO-2009015047 | 1/2009 |
| WO | WO-2009082814 | 7/2009 |
| WO | WO-2009089308 | 7/2009 |
| WO | WO-2010141403 | 12/2010 |
| WO | WO-2011014138 | 2/2011 |
| WO | WO-2012152817 | 11/2012 |
| WO | WO-2013048510 | 4/2013 |
| WO | WO-2013154561 | 10/2013 |
| WO | WO-2013171481 | 11/2013 |
| WO | WO-2013184225 | 12/2013 |

OTHER PUBLICATIONS

"Non-Final Office Action", U.S. Appl. No. 13/920,323, Feb. 27, 2015, 13 pages.
"Non-Final Office Action", U.S. Appl. No. 14/456,679, Jun. 19, 2015, 22 pages.
Abraham,"Hierarchical Hub Labelings for Shortest Paths", In Technical Report MSR-TR-MSR-TR-2012-46, Apr. 2012, 15 pages.
Bast,"Fast Routing in Road Networks with Transit Nodes", In Proceedings of Science, vol. 316, No. 5824, Apr. 27, 2007, p. 566.
Bast,"Route Planning in Transportation Networks", In Technical Report MSR-TR-2014-4, Jan. 8, 2014, 57 pages.
Bleiweiss,"GPU Accelerated Pathfinding", In Proceedings of the 23rd ACM Siggraph/Eurographics symposium on Graphics hardware, Jun. 20, 2008, pp. 65-74.
Cormen,"Introduction to Algorithms", The MIT Press, Jul. 31, 2009, 43 pages.
Delling,"Customizable Route Planning in Road Networks", In Proceedings of the Sixth Annual Symposium on Combinatorial Search, Jul. 2011, pp. 1-31.
Delling,"Customizable Route Planning", In Proceedings of the 10th International Symposium on Experimental Algorithms, May 2011, pp. 1-12.
Delling,"Faster Customization of Road Networks", In Proceedings of the 12th International Symposium on Experimental Algorithms, Jun. 5, 2013, pp. 1-12.
Delling,"Graph Partitioning with Natural Cuts", In Proceedings of the IEEE International Parallel & Distributed Processing Symposium, May 16, 2011, 15 pages.
Delling,"PHAST: Hardware-Accelerated Shortest Path Trees", In Journal of Parallel and Distributed Computing, vol. 73, No. 7, Jul. 2013, 11 pages.
Delling,"Query Scenarios for Customizable Route Planning", U.S. Appl. No. 13/649,114, Oct. 11, 2012, 27 pages.
Dong,"Image Retargeting by Content-Aware Synthesis", IEEE Transactions on Visualization and Computer Graphics, vol. XX, No. XX, June 2014, Mar. 26, 2014, 14 pages.
Efentakis,"Optimizing Landmark-Based Routing and Preprocessing", In Proceedings of the Sixth ACM SIGSPATIAL International Workshop on Computational Transportation Science, Nov. 5, 2013, 6 pages.
Geisberger,"Efficient Routing in Road Networks with Turn Costs", In Proceedings of the 10th International Conference on Experimental Algorithms, May 5, 2011, 12 pages.
Gooch,"Color2Gray: Salience-Preserving Color Removal", In Journal of ACM Transactions on Graphics, vol. 24 Issue 3, Jul. 2006.
Holzer,"Engineering Multilevel Overlay Graphs for Shortest-Path Queries", In ACM Journal of Experimental Algorithmics, vol. 13, Sep. 2008, 26 pages.
Kohler,"Fast Point-to-Point Shortest Path Computations with Arc-Flags", In Proceedings of Shortest Path Computations: Ninth DIMACS Challenge, vol. 24 of DIMACS Book. American Mathematical Society, Nov. 13, 2006, pp. 1-27.
Lilly,"Robust Speech Recognition Using Singular Value Decomposition Based Speech Enhancement", IEEE Tencon, 1997, 4 pages.
Lu,"Context Aware Textures", In Journal of ACM Transactions on Graphics, vol. 26 Issue 1, Jan. 2007, 31 pages.
Madduri,"Parallel Shortest Path Algorithms for Solving Large-Scale Instances", In Proceedings of 9th DIMACS Implementation Challenge—The Shortest Path Problem, Aug. 30, 2006, 39 pages.
Meyer,"D-Stepping: A Parallelizable Shortest Path Algorithm", In Journal of Algorithms, vol. 49, Issue 1, Oct. 2003, pp. 114-152.
Ortega-Arranz,"A New GPU-based Approach to the Shortest Path Problem", In Proceedings of International Conference on High Performance Computing and Simulation, Jul. 1, 2013, 7 pages.
Perumalla,"GPU-based Real-Time Execution of Vehicular Mobility Models in Large-Scale Road Network Scenarios", In ACM/IEEE/SCS 23rd Workshop on Principles of Advanced and Distributed Simulation, Jun. 22, 2009, 9 pages.
Shan,"Image Based Surface Detail Transfer", In IEEE Computer Graphics and Applications, vol. 24 Issue 3, May 2004, 6 pages.
Shen,"Agent-based Traffic Simulation and Traffic Signal Timing Optimization with GPU", 2011 14th International IEEE Conference

(56) References Cited

OTHER PUBLICATIONS on Intelligent Transportation Systems, Oct. 5, 2011, pp. 145-150.
Sommer,"Shortest-Path Queries in Static Networks", In Proceedings of ACM Computing Surveys, Apr. 7, 2014, 35 pages.
Wodecki,"Multi-GPU Parallel Memetic Algorithm for Capacitated Vehicle Routing Problem", In Proceedings of Distributed, Parallel, and Cluster Computing, Jan. 21, 2014, pp. 207-214.
"Creating Interactive Virtual Auditory Environments", IEEE Computer Graphics and Applications, Aug. 2002, 10 pages.
"Final Office Action", U.S. Appl. No. 13/920,323, Sep. 24, 2015, 24 pages.
"Integrated Vapor Chamber for Thermal Management of Computing Devices", U.S. Appl. No. 14/294,040, filed Jun. 2, 2014, 27 pages.
"International Search Report and the Written Opinion", Application No. PCT/US2015/036595, Sep. 24, 2015, 10 pages.
"International Search Report and the Written Opinion", Application No. PCT/US2015/017872, Jun. 25, 2015, 11 pages.
"International Search Report and the Written Opinion", Application No. PCT/US2015/033545, Aug. 20, 2015, 11 pages.
"International Search Report and the Written Opinion", Application No. PCT/US2015/022887, Jun. 26, 2015, 12 pages.
"International Search Report and the Written Opinion", Application No. PCT/US2015/029334, Jul. 7, 2015, 12 pages.
"International Search Report and the Written Opinion", Application No. PCT/US2015/033872, Sep. 2, 2015, 12 pages.
"International Search Report and the Written Opinion", Application No. PCT/US2015/035219, Sep. 29, 2015, 12 pages.
"International Search Report and the Written Opinion", Application No. PCT/US2015/027689, Jul. 8, 2015, 13 pages.
"International Search Report and the Written Opinion", Application No. PCT/US2015/026971, Jul. 24, 2015, 15 pages.
"International Search Report and the Written Opinion", Application No. PCT/US2014/041023, Mar. 6, 2015, 17 pages.
"International Search Report and the Written Opinion", Application No. PCT/US2015/036767, Sep. 14, 2015, 19 pages.
"International Search Report and the Written Opinion", Application No. PCT/US2015/027688, Sep. 7, 2015, 9 pages.
"International Search Report and the Written Opinion", Application No. PCT/US2014/041014, Oct. 2, 2014, 9 pages.
"Non-Final Office Action", U.S. Appl. No. 13/923,917, May 28, 2015, 9 pages.
"Non-Final Office Action", U.S. Appl. No. 13/923,969, May 6, 2015, 7 pages.
"Non-Final Office Action", U.S. Appl. No. 14/201,704, Jul. 1, 2015, 6 pages.
"Non-Final Office Action", U.S. Appl. No. 14/266,795, Oct. 7, 2015, 10 pages.
"Non-Final Office Action", U.S. Appl. No. 14/273,100, Oct. 1, 2015, 20 pages.
"Notice of Allowance", U.S. Appl. No. 14/312,562, Sep. 18, 2015, 13 pages.
"Restriction Requirement", U.S. Appl. No. 14/279,146, Sep. 3, 2015, 6 pages.
Ajwani,"Breadth First Search on Massive Graphs", In Proceedings of the 9th DIMACS Implementation Challenge: The Shortest Path Problem, Nov. 2006, 15 pages.
Barrett,"Implementations of Routing Algorithms for Transportation Networks", In Proceedings of the 9th DIMACS Implementation Challenge: The Shortest Path Problem, Nov. 2006, 19 pages.
Belhumeur,"Eigenfaces vs. Fisherfaces: Recognition Using Class Specific Linear Projection", IEEE Transactions on Pattern Analysis and Machine Intelligence, Jul. 1997, pp. 711-720.
Bohus,"Olympus: An Open-Source Framework for Conversational Spoken Language Interface Research", In Proceedings of the Workshop on Bridging the Gap: Academic and Industrial Research in Dialog Technologies, Apr. 2007, 8 pages.
Cao,"Face Recognition with Learning-based Descriptor", In Proceedings of the IEEE Conference on Computer Vision and Pattern Recognition (CVPR), Jun. 2010, 8 pages.
Chandrasekaran,"Sparse and Low-Rank Matrix Decompositions"; IFAC Symposium on System Identification, 2009, 6 pages.
Chen,"Bayesian Face Revisited: A Joint Formulation", In Proceedings of the 12th European Conference on Computer Vision (ECCV), Oct. 2012, 14 pages.
Chen,"Supplemental Material for Bayesian Face Revisited: A Joint Formulation", Apr. 2013, 5 pages.
Cootes,"Modeling Facial Shape and Appearance", Handbook of Face Recognition, Springer, New York, US, 2005, pp. 39-63.
Davis,"Information-Theoretic Metric Learning", In Proceedings of the 24th International Conference on Machine Learning (ICML), Jun. 2007, 8 pages.
Delano,"Integrated Development Environments for Natural Language Processing", Available at: http://www.textanalysis.com/TAI-IDE-WP.pdf, Oct. 2001, 13 pages.
Delling,"Customizable Route Planning", U.S. Appl. No. 13/152,313, filed Jun. 3, 2011, 23 pages.
Delling,"Customizable Route Planning", U.S. Appl. No. 13/868,135, filed Apr. 23, 2013, 33 pages.
Delling,"Customizing Driving Directions With GPUs", In Proceedings of the 20th Euro-Par International Conference on Parallel Processing, Aug. 2014, 12 pages.
Delling,"High-Performance Multi-Level Graphs", In Proceedings of the 9th DIMACS Implementation Challenge: The Shortest Path Problem, Nov. 2006, 13 pages.
Delling,"Highway Hierarchies Star", In Proceedings of the 9th DIMACS Implementation Challenge: The Shortest Path Problem, Nov. 2006, 29 pages.
Demetrescu,"The Shortest Path Problem: Ninth DIMACS Implementation Challenge", In Proceedings of DIMACS Series in Discrete Mathematics and Theoretical Computer Science, Jul. 28, 2009, 3 pages.
Diez,"Optimization of a Face Verification System Using Bayesian Screening Techniques", In Proceedings of the 23rd IASTED International Multi-Conference on Artificial Intelligence and Applications, Feb. 2005, pp. 427-432.
Ding,"Handbook of Face Recognition, Chapter 12: Facial Landmark Localization", Jan. 1, 2011, 19 pages.
Dos"LUP: A Language Understanding Platform", A Dissertation for the Degree of Master of Information Systems and Computer Engineering, Jul. 2012, 128 pages.
Eagle,"Common Sense Conversations: Understanding Casual Conversation using a Common Sense Database", In Proceedings of the Artificial Intelligence, Information Access, and Mobile Computing Workshop, Aug. 2003, 6 pages.
Edmonds,"Single-Source Shortest Paths With the Parallel Boost Graph Library", In Proceedings of the 9th DIMACS Implementation Challenge: The Shortest Path Problem, Nov. 4, 2006, 20 pages.
Geisberger,"Exact Routing in Large Road Networks using Contraction Hierarchies", In Proceedings of Transportation Science, vol. 46, No. 3, Aug. 2012, 17 pages.
Goldberg,"Better Landmarks within Reach", In Proceedings of the 6th International Conference on Experimental Algorithms, Jun. 6, 2007, 14 Pages.
Guillaumin,"Is that you? Metric Learning Approaches for Face Identification", In Proceedings of 12th IEEE International Conference on Computer Vision (ICCV), Sep. 2009, 8 pages.
He,"What is Discriminative Learning", Discriminative Learning for Speech Recognition Theory and Practice, Achorn International, Jun. 25, 2008, 25 pages.
Hoffmeister,"Log-linear Model Combination with Word-dependent Scaling Factors", Human Language Technology and Pattern Recognition Computer Science Department, 2009, 4 pages.
Huang,"Labeled Faces in the Wild: A Database for Studying Face Recognition in Unconstrained Environments", In Proceedings of the 10th European Conference on Computer Vision (ECCV), Oct. 2008, 11 pages.
Huang,"Unified Stochastic Engine (USE) for Speech Recognition", School of Computer Science, 1993, 4 pages.
Ioffe,"Probabilistic Linear Discriminant Analysis", International Journal of Computer Vision, Jun. 2001, 12 pages.

(56) References Cited

OTHER PUBLICATIONS

Karpinski,"Multi-GPU Parallel Memetic Algorithm for Capacitated Vehicle Routing Problem", Lecture Noes in Computer Science, May 8, 2014, 12 pages.

Keshtkar,"A Corpus-based Method for Extracting Paraphrases of Emotion Terms", Proceedings of the NAACL HLT 2010 Workshop on Computational Approaches to Analysis and Generation of Emotion in Text, 2010, 10 pages.

Ko,"Cammia—A Context-Aware Spoken Dialog System for Mobile Environments", In Automatic Speech Recognition and Understanding, Jul. 29, 2011, 2 pages.

Kumar,"Attribute and Simile Classifiers for Face Verification", In Proceedings of the 12th IEEE International Conference on Computer Vision (ICCV), Sep. 2009, 8 pages.

Kumar,"Describable Visual Attributes for Face Verification and Image Research", IEEE Transactions on Pattern Analysis and Machine Intelligence, Oct. 2011, 17 pages.

Kumar,"Face Recognition Using Gabor Wavelets", In Proceedings of the 40th IEEE Asilomar Conference on Signals, Systems and Computers, Oct. 2006, 5 pages.

Lanitis,"Toward Automatic Simulation of Aging Effects on Face Images", IEEE Trans. PAML, vol. 24, No. 4, Apr. 2002, 14 pages.

Lauther,"An Experimental Evaluation for Point-To-Point Shortest Path Calculation on Roadnetworks with Precalculated Edge-Flags", In Proceedings of the 9th DIMACS Implementation Challenge: The Shortest Path Problem, Nov. 2006, 18 pages.

Lee,"Intention-Based Corrective Feedback Generation using Context-Aware Model", In Proceedings of the Second International Conference on Computer Supported Education, Apr. 7, 2010, 8 pages.

Lei,"Face Recognition by Exploring Information Jointly in Space, Scale and Orientation", IEEE Transactions on Image Processing, Jan. 2011, pp. 247-256.

Li,"Bayesian Face Recognition Using Support Vector Machine and Face Clustering", In Proceedings of the IEEE Computer Society on Computer Vision Pattern and Recognition (CVPR), Jun. 2004, 7 pages.

Li,"Comparison of Discriminative Input and Output Transformations for Speaker Adaptation in the Hybrid NN/ HMM Systems", In Proceedings of 11th Annual Conference of the International Speech Communication Association, Sep. 26, 2010, 4 pages.

Li,"Probabilistic Models for Inference about Identity", IEEE Transactions on Pattern Recognition and Machine Intelligence, Jan. 2012, 16 pages.

Liang,"Face Alignment via Component-Based Discriminative Search", Computer Vision, ECCV 2008, Lecture Notes in Computer Science vol. 5303, 2008, 14 pages.

Martin,"CUDA Solutions for the SSSP Problem", In Proceedings of 9th International Conference Baton Rouge, May 25, 2009, 10 pages.

Moghaddam,"Bayesian Face Recognition", The Journal of Pattern Recognition, Nov. 2000, pp. 1771-1782.

Moreira,"Towards the Rapid Development of a Natural Language Understanding Module", In Proceedings of the 10th International Conference on Intelligent Virtual Agents, Jan. 2011, 7 pages.

Nguyen,"Cosine Similarity Metric Learning for Face Verification", In Proceedings of the 10th Asian Conference on Computer Vision (ACCV), Nov. 2010, 12 pages.

Ojala,"A Generalized Local Binary Pattern Operator for Multiresolution Gray Scale and Rotation Invariant Texture Classification", In Proceedings of the 2nd International Conference on Advances in Pattern Recognition (ICAPR), Mar. 2001, 10 pages.

Pascoal,"Implementations and Empirical Comparison of K Shortest Loopless Path Algorithms", In Proceedings of the 9th DIMACS Implementation Challenge: The Shortest Path Problem, Nov. 2006, 16 pages.

Phillips,"The FERET Evaluation Methodology for Face-Recognition Algorithms", IEEE Transactions on Pattern Analysis and Machine Intelligence, Oct. 2000, pp. 1090-1104.

Powell,"Increased Accuracy Corner Cube Arrays for High Resolution Retro-Reflective Imaging Applications", U.S. Appl. No. 62/062,732, filed Oct. 10, 2014, 46 pages.

Raghuvanshi,"Parametric Wave Field Coding for Precomputed Sound Propagation", Jul. 2014, 11 pages.

Ramanan,"Local Distance Functions: A Taxonomy, New Algorithms, and an Evaluation", IEEE Transactions on Pattern Analysis and Machine Intelligence, Apr. 2011, 8 pages.

Rodrig,"Command User Interface for Displaying and Scaling Selectable Controls and Commands", U.S. Appl. No. 14/254,681, filed Apr. 16, 2014, 51 pages.

Sanders,"Robust, Almost Constant Time Shortest-Path Queries in Road Networks", In Proceedings of the 9th DIMACS Implementation Challenge: The Shortest Path Problem, Nov. 2006, 19 pages.

Santos,"K Shortest Path Algorithms", In Proceedings of the 9th DIMACS Implementation Challenge: The Shortest Path Problem, Nov. 2006, 13 pages.

Sarukkai,"Word Set Probability Boosting for Improved Spontaneous Dialog Recognition", IEEE Transactions on Speech and Audio Processing, vol. 5, No. 5, Sep. 1997, 13 pages.

Seneff,"Galaxy-II: A Reference Architecture for Conversational System Development", In Proceedings of the 5th International Conference on Spoken Language Processing, Nov. 2008, 4 pages.

Seo,"Face Verification Using the LARK Representation", IEEE Transactions on Information Forensics and Security, Dec. 2011, 12 pages.

Sing,"Domain Metric Knowledge Model for Embodied Conversation Agents", In 5th International Conference on Research, Innovation & Vision for the Future, Mar. 5, 2007, 7 pages.

Susskind,"Modeling the joint density of two images under a variety of transformations", In Proceedings of the IEEE Computer Society Conference on Computer Vision and Pattern Recognition (CVPR), Jun. 2011, 8 pages.

Taigman,"Leveraging Billions of Faces to Overcome Performance Barriers in Unconstrained Face Recognition", Aug. 4, 2011, 7 pages.

Taigman,"Multiple One-Shots for Utilizing Class Label Information", In Proceedings of the British Machine Vision Conference (BMVC), Sep. 2009, 12 pages.

Tian,"Facial Expression Analysis", Handbook of Face Recognition, pp. 247-275.

Wang,"A Unified Framework for Subspace Face Recognition", retrieved at <<http://ieeexplore.ieee.org/Xplore/login.jsp?url=http%3A%2F%2Fieeexplore.ieee.org%2Fiel5%2F34%2F29188%2F01316855.pdf&authDecision=-203>>, Sep. 2004, pp. 1222-1228.

Wang,"Bayesian Face Recognition Using Gabor Features", In Proceedings of the ACM SIGMM Workshop on Biometrics Methods and Applications (WBMA), Nov. 8, 2003, pp. 70-73.

Wang,"Boosted Multi-Task Learning for Face Verification with Applications to Web Image and Video Search", In Proceedings of the IEEE Conference on Computer Vision and Pattern Recognition, Jun. 2009, 8 pages.

Wang,"Subspace Analysis Using Random Mixture Models", In Proceedings of the IEEE Computer Society Conference on Computer Vision and Pattern Recognition (CVPR), Jun. 2005, 7 pages.

Weinberger,"Distance Metric Learning for Large Margin Nearest Neighbor Classification", In Proceedings of the Conference on Advances in Neural Information Processing Systems (NIPS), Dec. 2008, 8 pages.

Xue,"Singular Value Decomposition Based Low-Footprint Speaker Adaptation and Personalization for Deep Neural Network", In Proceedings of the IEEE International Conference on Acoustics, Speech and Signal Processing, May 4, 2014, 5 pages.

Ying,"Distance Metric Learning with Eigenvalue Optimization", Journal of Machine Learning Research, Jan. 3, 2012, 26 pages.

Zhang,"Two-Dimensional Bayesian Subspace Analysis for Face Recognition", In Proceedings of the 4th International Symposium on Neutral Networks (ISNN), Jun. 2007, 7 pages.

Zhu,"A Rank-Order Distance based Clustering Algorithm for Face Tagging", In Proceedings of the IEEE Conference on Computer Vision and Pattern Recognition (CVPR), Jun. 2011, pp. 481-488.

(56) References Cited

OTHER PUBLICATIONS

"Final Office Action", U.S. Appl. No. 14/304,911, Nov. 13, 2015, 7 pages.
"Final Office Action", U.S. Appl. No. 14/456,679, Nov. 2, 2015, 26 pages.
"International Search Report and Written Opinion", Application No. PCT/US2015/036587, Oct. 8, 2015, 11 Pages.
"International Search Report and Written Opinion", Application No. PCT/US2015/029805, Oct. 15, 2015, 20 pages.
"Non-Final Office Action", U.S. Appl. No. 14/279,146, Dec. 8, 2015, 9 pages.
Cvetkovic,"Image enhancement circuit using nonlinear processing curve and constrained histogram range equalization", Visual Communications and Image Processing 2004, 2004, 12 pages.
Grasset,"Image-Driven View Management for Augmented Reality Browsers", IEEE International Symposium on Mixed and Augmented Reality (ISMAR), Nov. 5, 2012, 10 pages.
Rosten,"Real-time Video Annotations for Augmented Reality", Advances in Visual Computing Lecture Notes in Computer Science, Jan. 1, 2005, 8 pages.
Yin,"An Associate-Predict Model for Face Recognition", Proceedings of the IEEE Conference on Computer Vision and Pattern Recognition, Jun. 2011, 8 pages.
"Cisco Bring Your Own Device", Available at: http://www.cisco.com/c/en/us/td/docs/solutions/Enterprise/Borderless_Networks/Unified_Access/byodwp.html, Mar. 2014, 23 Pages.
"Unified Communications Interoperability Forum and Open Networking Foundation Announce Collaborative Relationship Between Unified Communications and Software-Defined Networks", Retrieved From: <http://www.businesswire.com/news/home/20131120005275/en/Unified-Communications-Interoperability-Forum-Open-Networking-Foundation> Mar. 7, 2014, Nov. 20, 2013, 2 Pages.
"Unified Communications Managed API 3.0 Core SDK Documentation", retrieved from: http://msdn.microsoft.com/en-us/library/gg421023.aspx on Feb. 14, 2012, Dec. 1, 2011 2 pages.
Ferguson, "Five Key Criteria for adaptable SDN Wi-Fi", Retrieved From: <http://www.extremenetworks.com/five-key-criteria-for-adaptable-sdn-wi-fi/> Mar. 7, 2014, Nov. 25, 2013, 7 Pages.
Van "Unified Communication and Collaboration from the User's Perspective", retrieved from: http://www.ucstrategies.com/unified-communications-expert-views/unified-communication-and-collaboration-from-the-users-perspective.aspx , Dec. 8, 2009 2 pages.
"Corporate Telecommunication Networks—Mobility for Enterprise Communications", ECMA/TC32-TG17/2010/056, XP050514180, Geneva [retrieved on Nov. 4, 2010], Oct. 2010, 38 pages.
"Final Office Action", U.S. Appl. No. 12/970,949, Jun. 10, 2015, 25 pages.
"Final Office Action", U.S. Appl. No. 13/327,794, Nov. 20, 2014, 13 pages.
"Final Office Action", U.S. Appl. No. 13/530,015, Nov. 19, 2014, 48 pages.
"International Search Report and Written Opinion", Application No. PCT/US2015/024594, Jul. 24, 2015, 10 Pages.
"International Search Report and Written Opinion", Application No. PCT/US2015/032089, Jul. 31, 2015, 12 pages.
"International Search Report and Written Opinion", Application No. PCT/US2015/027409, Jul. 22, 2015, 13 pages.
"International Search Report and Written Opinion", Application No. PCT/US2015/028383, Jul. 24, 2015, 13 pages.
"Non-Final Office Action", U.S. Appl. No. 12/970,949, Jan. 2, 2015, 24 pages.
"Non-Final Office Action", U.S. Appl. No. 13/530,015, Apr. 28, 2015, 32 pages.
"Non-Final Office Action", U.S. Appl. No. 13/903,944, Mar. 27, 2015, 24 pages.
"Non-Final Office Action", U.S. Appl. No. 14/264,012, Jul. 31, 2015, 7 pages.
"Non-Final Office Action", U.S. Appl. No. 14/304,911, Jul. 17, 2015, 6 pages.

"Notice of Allowance", U.S. Appl. No. 12/970,939, Dec. 19, 2014, 10 pages.
"Notice of Allowance", U.S. Appl. No. 12/970,943, Dec. 19, 2014, 10 pages.
"Notice of Allowance", U.S. Appl. No. 13/026,058, Nov. 7, 2014, 5 pages.
"Notice of Allowance", U.S. Appl. No. 13/367,377, Feb. 7, 2012, 10 pages.
Malony,"Compensation of Measurement Overhead in Parallel Performance Profiling", The International Journal of High Performance Computing Applications, May 1, 2007, 23 pages.
"Acoustics—Measurement of room acoustic parameters—Part 1: Performance spaces", In ISO 3382-1:2009, May 6, 2014, 2 pages.
"Debug Navigator Help: Using Debug Gauges", https://developer.apple.com/library/mac/recipes/xcode_help-debug_navigator/articles/using_debug_gauges.html#//apple_ref/doc/uid/TP40010432-CH8-SW1, May 28, 2014, 3 pages.
"Deployment Planning Tips for Office 365", http://technet.microsoft.com/en-us/library/hh852435.aspx, Oct. 14, 2012, 7 pages.
"Failover Cluster Step-by-Step Guide: Validating Hardware for a Failover Cluster", http://technet.microsoft.com/en-us/library/cc732035(v=ws.10).aspx, Mar. 20, 2011, 10 pages.
"Get history and other info about your code", <<http://msdn.microsoft.com/en-us/library/dn269218.aspx>>, retrieved May 23, 2014,, 10 pages.
"Interactive 3D Audio Rendering Guidelines, Level 2.0", In proceedings of 3D Working Group of the Interactive Audio Special Interest Group, Sep. 20, 1999, 29 pages.
"Interest Point Detection", Available at: http://en.wikipedia.org/wiki/Interest_point_detection, Apr. 21, 2014, 3 pages.
"Lifecycle Services for Microsoft Dynamics User Guide (LCS) [AX 2012]", Available at: http://technet.microsoft.com/en-us/library/dn268616.aspx, Aug. 8, 2013, 5 pages.
"Low-Footprint Adaptation and Personalization fora Deep Neural Network", U.S. Appl. No. 14/201,704, Mar. 7, 2014, 20 pages.
"Microsoft CodeLens Code Health Indicator extension", <<https://developer.apple.com/library/ios/documentation/ToolsLanguages/Conceptual/Xcode_Overview/DebugYourApp/DebugYourApp.html>>, Mar. 10, 2014, 13 pages.
"New CodeLens Indicator—Incoming Changes", <<http://msdn.microsoft.com/en-us/library/dn269218.aspx>>, retrieved May 23, 2014,, 8 pages.
"Secure Separation in Cisco Unified Data Center Architecture", Available at: http://www.cisco.com/en//solutions/collateral/ns340/ns414/ns742/ns743/ns1050/white_paper_c11-722425.html, Oct. 1, 2013, 8 pages.
"Shared Hidden Layer Combination for Speech Recognition Systems", U.S. Appl. No. 14/265,110, Apr. 29, 2014, 22 pages.
"Types of vCloud Hybrid Service", Available at: http://pubs.vmware.com/vchs/index.jsp?topic=%2FGUID-FD4D5E84-1AB8-4A1B-8C3F-769176FCD154%2FGUID-375065F3-110A-4B84-99FA-FB8467361960.html, Dec. 16, 2012, 2 pages.
"UI Element Guidelines: Menus", Available at: https://developer.apple.com/library/mac/documentation/userexperience/conceptual/apple higuidelines/Menus/Menus.html, Sep. 26, 2011, 22 pages.
"Xcode OpenGL ES Tools Overview", Retrieved on: Jun. 5, 2014 Available at: https://developer.apple.com/library/prerelease/ios/documentation/3DDrawing/Conceptual/OpenGLES_ProgrammingGuide/ToolsOverview/ToolsOverview.html, 10 pages.
Abad, et al.,' "Context Dependent Modelling Approaches for Hybrid Speech Recognizers", In Proceeding of Interspeech, Sep. 26, 2010, 4 pages.
Abdel-Hamid, et al.,' "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Abid, et al.,' "A New Neural Network Pruning Method Based on the Singular Value Decomposition and the Weight Initialization", In Proceedings of 11th European Signal Processing Conference, Sep. 3, 2002, 4 pages.

(56) References Cited

OTHER PUBLICATIONS

Ajdler, et al.,' "The Plenacoustic Function and Its Sampling", In IEEE Transactions on Signal Processing, vol. 54, Issue 10, Oct. 2006, 35 pages.
Ajmani, et al.,' "Scheduling and Simulation: How to Upgrade Distributed Systems", In Proceedings of the 9th conference on Hot Topics in Operating Systems, vol. 9., May 18, 2013, 6 pages.
Alt, et al.,' "Increasing the User's Attention on the Web: Using Implicit Interaction Based on Gaze Behavior to Tailor Content", In Proceedings of the 7th Nordic Conference on Human-Computer Interaction—Making Sense through Design, Oct. 14, 2012, 10 pages.
Azizyan, et al.,' "SurroundSense: Mobile Phone Localization via Ambience Fingerprinting", In Proceedings of the 15th annual international conference on Mobile computing and networking, Sep. 20, 2009, 12 pages.
Barman, et al.,' "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Beymer, et al.,' "WebGazeAnalyzer: A System for Capturing and Analyzing Web Reading Behavior Using Eye Gaze", In Proceedings of Extended Abstracts on Human Factors in Computing Systems, Apr. 2, 2005, 10 pages.
Bonzi, et al.,' "The Use of Anaphoric Resolution for Document Description in Information Retrieval", In Proceedings of Information Processing & Management, vol. 25, Issue 4, Jun. 1989, 14 pages.
Bradley, et al.,' "Accuracy and Reproducibility of Auditorium Acoustics Measures", In Proceedings of British Institute of Acoustics, vol. 10, May 6, 2014, 2 pages.
Broder, "A Taxonomy of Web Search", In Proceedings of ACM SIGIR Forum, vol. 36, Issue 2, Sep. 2002, 8 pages.
Burges, "From Ranknet to Lambdarank to Lambdamart: An Overview", In Microsoft Research Technical Report MSR-TR-2010-82, Jun. 23, 2010, 19 pages.
Burges, "Learning to Rank with Nonsmooth Cost Functions", In Proceedings of the Advances in Neural Information Processing Systems, Dec. 2006, 8 pages.
Buscher, et al.,' "Generating and Using Gaze-Based Document Annotations", In Proceedings of Extended Abstracts on Human Factors in Computing Systems, Apr. 5, 2008, 6 pages.
Calamia, "Advances in Edge-Diffraction Modeling for Virtual-Acoustic Simulations", In Doctoral Dissertation of Princeton University, Jun. 2009, 159 pages.
Calian, "Passage-Level Evidence in Document Retrieval", In Proceedings of the 17th Annual International ACM SIGIR Conference on Research and Development in Information Retrieval, Jul. 3, 1994, 9 Pages.
Castro, et al.,' "A Probabilistic Room Location Service for Wireless Networked Environments", In Proceedings of the 3rd international conference on Ubiquitous Computing, Sep. 30, 2001, 19 pages.
Chandak, et al.,' "AD-Frustum: Adaptive Frustum Tracing for Interactive Sound Propagation", In IEEE Transactions on Visualization and Computer Graphics, vol. 14, Issue 6, Nov. 2008, 8 pages.
Chen, "Building Language Model on Continuous Space using Gaussian Mixture Models", In Proceedings of Research in Language Modeling, Jan. 2007, 66 pages.
Cheng, et al.,' "Entityrank: Searching Entities Directly and Holistically", In Proceedings of the 33rd International Conference on Very Large Data Bases, Sep. 23, 2007, 12 pages.
Cheng, et al.,' "Heritage and Early History of the Boundary Element Method", In Proceedings of Engineering Analysis with Boundary Elements, vol. 29, Issue 3, Mar. 2005, 35 pages.
Chi, et al.,' "Visual Foraging of Highlighted Text: An Eye-Tracking Study", In Proceedings of the 12th International Conference on Human-Computer Interaction—Intelligent Multimodal Interaction Environments, Jul. 22, 2007, 10 pages.
Choi, et al.,' "Face Annotation for Personal Photos Using Collaborative Face Recognition in Online Social Networks", In 16th International Conference on Digital Signal Processing, Jul. 5, 2009, 8 pages.
Choudhury, et al.,' "A Framework for Robust Online Video Contrast Enhancement Using Modularity Optimization", In IEEE Transactions on Circuits and Systems for Video Technology, vol. 22 , Issue: 9, Sep. 2012, 14 pages.
Clarke, "Exploiting Redundancy in Question Answering", In Proceedings of the 24th Annual International ACM SIGIR Conference on Research and Development in Information Retrieval, Sep. 9, 2001, 8 pages.
Cucerzan, "Large-Scale Named Entity Disambiguation Based on Wikipedia Data", In Proceedings of the Joint Conference on Empirical Methods in Natural Language Processing and Computational Natural Language Learning, Jun. 28, 2007, 9 Pages.
Dahl, et al.,' "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, et al.,' "Large Vocabulary Continuous Speech Recognition with Context-Dependent DBN-HMMs", In IEEE International Conference on Acoustics, Speech and Signal Processing, May 22, 2011, 4 pages.
Davis, et al.,' "Low-Rank Approximations for Conditional Feedforward Computation in Deep Neural Networks", In Proceedings of ArXiv preprint arXiv: 1312.4461, Dec. 2013, 10 Pages.
Edens, et al.,' "An Investigation of Broad Coverage Automatic Pronoun Resolution for Information Retrieval", In Proceedings of the 26th Annual International ACM SIGIR Conference on Research and Development in Information Retrieval, Jul. 28, 2003, 2 pages.
Fang, et al.,' "A Formal Study of Information Retrieval Heuristics", In Proceedings of the 27th Annual International ACM SIGIR Conference on Research and Development in Information Retrieval, Jul. 25, 2004, 8 pages.
Finkel, "Incorporating Non-Local Information into Information Extraction Systems by Gibbs Sampling", In Proceedings of the 43rd Annual Meeting on Association for Computational Linguistics, Jun. 2005, 8 pages.
Funkhouser, et al.,' "A Beam Tracing Method for Interactive Architectural Acoustics", In Journal of the Acoustical Society of America, Feb. 2004, 18 pages.
Funkhouser, et al.,' "Realtime Acoustic Modeling for Distributed Virtual Environments", In Proceedings of the 26th annual conference on Computer graphics and interactive techniques, Jul. 1, 1999, 10 pages.
Gade, "Acoustics in Halls for Speech and Music", In Springer Handbook of Acoustics, May 6, 2014, 8 pages.
Gemello, et al.,' "Adaptation of Hybrid ANN/HMM Models Using Linear Hidden Transformations and Conservative Training", In IEEE International Conference on Acoustics, Speech and Signal Processing, May 14, 2006, 4 pages.
Goldstein, et al.,' "Summarizing Text Documents: Sentence Selection and Evaluation Metrics", In Proceedings of the 22nd Annual International ACM SIGIR Conference on Research and Development in Information Retrieval, Aug. 1, 1999, 8 pages.
Gruenstein, et al.,' "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Gumerov, et al.,' "Fast multipole methods on graphics processors", In Journal of Computational Physics, vol. 227, Issue 18, Sep. 10, 2008, 4 pages.
Harper, et al.,' "A Language Modelling Approach to Relevance Profiling for Document Browsing", In Proceedings of the 2nd ACM/IEEE-CS Joint Conference on Digital Libraries, Jul. 13, 2007, 8 pages.
Harper, et al.,' "Within-Document Retrieval: A User-Centered Evaluation of Relevance Profiling", In Journal of Information Retrieval, vol. 7, Issue 3-4, Sep. 2004, 26 pages.
Harris, "On the use of windows for harmonic analysis with the discrete Fourier transform", In Proceedings of the IEEE vol. 66, Issue 1, Jan. 1978, 33 pages.

(56) References Cited

OTHER PUBLICATIONS

Hawamdeh, et al.,' "Paragraph-based nearest neighbor searching in full-text documents", In Proceedings of Electronic Publishing, vol. 2, Dec. 1989, 14 pages.

Hearst, "Tilebars: Visualization of Term Distribution Information in Full Text Information Access", In Proceedings of the SIGCHI Conference on Human Factors in Computing Systems, May 7, 1995, 8 pages.

Heck, et al.,' "Robustness to Telephone Handset Distortion in Speaker Recognition by Discriminative Feature Design", In Journal of Speech Communication—Speaker Recognition and its Commercial and Forensic Applications, vol. 31, Issue 2-3, Jun. 2000, 12 pages.

Hinton, et al.,' "Deep Neural Networks for Acoustic Modeling in Speech Recognition", In IEEE Signal Processing Magazine, vol. 29, Issue 6, Nov. 2012, 27 pages.

Hodgson, et al.,' "Experimental evaluation of radiosity for room sound-field prediction", In the Journal of the Acoustical Society of America, Aug. 2006, 12 pages.

Hsu, et al.,' "HBCI: Human-Building-Computer Interaction", In Proceedings of the 2nd ACM Workshop on Embedded Sensing Systems for Energy-Efficiency in Building, Nov. 2, 2010, 6 pages.

Jacob, "QR Directory App—Overview", In Blog of Josh Jacob Dev, Apr. 21, 2011.

Jaitly, et al.,' "Application of Pretrained Deep Neural Networks to Large Vocabulary Conversational Speech Recognition", In Proceedings of 13th Annual Conference of the International Speech Communication Association, Mar. 12, 2012, 11 pages.

Jones, "Automatic Summarising: The state of the Art", In Journal of Information Processing and Management: an International Journal, vol. 43, Issue 6, Nov. 1, 2007, 52 pages.

Kaszkiel, et al.,' "Effective Ranking with Arbitrary Passages", In Journal of the American Society for Information Science and Technology, vol. 52, Issue 4, Feb. 15, 2001, 21 pages.

Kaszkiel, et al.,' "Efficient Passage Ranking for Document Databases", In Journal of ACM Transactions on Information Systems, Oct. 1, 1999, 26 pages.

Kolarik, et al.,' "Perceiving Auditory Distance Using Level and Direct-to-Reverberant Ratio Cues", In the Journal of the Acoustical Society of America, Oct. 2011, 4 pages.

Konig, et al.,' "Nonlinear Discriminant Feature Extraction for Robust Text-Independent Speaker Recognition", In Proceeding of the RLA2C, ESCA workshop on Speaker Recognition and its Commercial and Forensic Applications, Apr. 1998, 4 pages.

Koo, et al.,' "Autonomous Construction of a WiFi Access Point Map Using Multidimensional Scaling", In Proceedings of the 9th international conference on Pervasive computing, Jun. 12, 2011, 18 pages.

Krokstad, "The Hundred Years Cycle in Room Acoustic Research and Design", In Proceedings of Reflections on sound, Jun. 2008, 30 pages.

Kumar, et al.,' "Gaze-Enhanced Scrolling Techniques", In Proceedings of the 20th Annual ACM Symposium on User Interface Software and Technology, Oct. 2007, 4 pages.

Kuttruff, "Room Acoustics, Fourth Edition", Available at: http://www.crcpress.com/product/isbn/9780419245803, Aug. 3, 2000, 1 page.

Laflen, et al.,' "Introducing New Features in the VSTS Database Edition GDR", http://msdn.microsoft.com/en-us/magazine/dd483214.aspx, Nov. 2008, 16 pages.

Lavrenko, et al.,' "Relevance-Based Language Models", In Proceedings of the 24th Annual International ACM SIGIR Conference on Research and Development in Information Retrieval, Sep. 9, 2001, 8 pages.

Lecouteux, et al.,' "Dynamic Combination of Automatic Speech Recognition Systems by Driven Decoding", In Journal of IEEE Transactions on Audio, Speech and Language Processing, Jan. 2013, 10 pages.

Li et al.,' "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

Li, et al.,' "Lattice Combination for Improved Speech Recognition", In Proceedings of the 7th International Conference of Spoken Language Processing, Sep. 16, 2002, 4 pages.

Li, et al.,' "Spatial Sound Rendering Using Measured Room Impulse Responses", In IEEE International Symposium on Signal Processing and Information Technology, Aug. 27, 2006, 5 pages.

Liao, "Speaker Adaptation of Context Dependent Deep Neural Networks", In IEEE International Conference on Acoustics, Speech and Signal Processing, May 26, 2013, 5 pages.

Lin, et al.,' "What Makes a Good Answer? The Role of Context in Question Answering", In Proceedings of the Ninth IFIP TC13 International Conference on Human-Computer Interaction, Sep. 2003, 8 pages.

Liu, et al.,' "Use of Contexts in Language Model Interpolation and Adaptation", In Journal of Computer Speech and Language vol. 27 Issue 1, Feb. 2009, 23 pages.

Loizides, et al.,' "The Myth of Find: User Behaviour and Attitudes Towards the Basic Search Feature", In Proceedings of the 8th ACM/IEEE-CS Joint Conference on Digital Libraries, Jun. 16, 2008, 4 pages.

Lv, et al.,' "A Comparative Study of Methods for Estimating Query Language Models with Pseudo Feedback", In Proceedings of the 18th ACM Conference on Information and Knowledge Management, Nov. 2, 2009, 4 pages.

Lv, et al.,' "Positional Language Models for Information Retrieval", In Proceedings of the 32nd International ACM SIGIR Conference on Research and Development in Information Retrieval, Jul. 19, 2009, 8 pages.

Machiraju, et al.,' "Designing Multitenant Applications on Windows Azure", Available at: http://msdn.microsoft.com/en-us/library/windowsazure/hh689716.aspx, Apr. 18, 2013, 20 pages.

Mavridis, et al.,' "Friends with Faces: How Social Networks Can Enhance Face Recognition and Vice Versa", In Proceedings of Computational Social Networks Analysis: Trends, Tools and Research Advances, May 24, 2010, 30 pages.

Mehra, et al.,' "An efficient GPU-based time domain solver for the acoustic wave equation", In Proceedings of Applied Acoustics, vol. 73, Issue 2, Feb. 2012, 13 pages.

Mehra, et al.,' "Wave-Based Sound Propagation in Large Open Scenes Using an Equivalent Source Formulation", In Journal of ACM transactions on Graphics, vol. 32, Issue 2, Apr. 1, 2013, 13 pages.

Mehrotra, et al.,' "nterpolation of Combined Head and Room Impulse Response for Audio Spatialization", In Proceeding of IEEE 13th International Workshop on Multimedia Signal Processing, Oct. 17, 2011, 6 pages.

Meinedo, et al.,' "Combination of Acoustic Models in Continuous Speech Recognition Hybrid Systems", In Proceedings of Sixth International Conference on Spoken Language Processing, Oct. 2000, 4 pages.

Mihalcea, et al.,' "Wikify!: Linking Documents to Encyclopedic Knowledge", In Proceedings of the Sixteenth ACM Conference on Conference on Information and Knowledge Management,, Nov. 6, 2007, 9 Pages.

Mohamed, et al.,' "Acoustic Modeling Using Deep Belief Networks", In IEEE Transactions on Audio, Speech, and Language Processing, vol. 20, Issue 1, Jan. 2012, 10 pages.

Motlicek, et al.,' "Feature and Score Level Combination of Subspace Gaussinasin LVCSR Task", In IEEE International Conference on Acoustics, Speech and Signal Processing, May 26, 2013, 5 pages.

Na, et al.,' "A 2-Poisson Model for Probabilistic Coreference of Named Entities for Improved Text Retrieval", In Proceedings of the 32nd International ACM SIGIR Conference on Research and Development in Information Retrieval, Jul. 19, 2009, 8 pages.

Neve, et al.,' "Face Recognition for Personal Photos using Online Social Network Context and Collaboration", In Guest Lecture at KAIST, Dec. 14, 2010, 54 pages.

Novak, et al.,' "Use of Non-Negative Matrix Factorization for Language Model Adaptation in a Lecture Transcription Task", In

(56) References Cited

OTHER PUBLICATIONS

Proceedings of IEEE International Conference on Acoustics, Speech, and Signal Processing, vol. 1, May 7, 2001, 4 pages.

Papadopoulos, et al.,' "Image Clustering Through Community Detection on Hybrid Image Similarity Graphs", In 17th IEEE International Conference on Image Processing, Sep. 26, 2014, 4 pages.

Perenson, "In-depth Look at Google+ Photo Update with the Team that Designed it", Available at: http://connect.dpreview.com/post/1400574775/hands-on-with-google-plus-photo-update, May 17, 2013, 10 pages.

Peter, et al.,' "Frequency-domain edge diffraction for finite and infinite edges", In Proceedings of Acta acustica united with acustica, vol. 95, No. 3, May 6, 2014, 2 pages.

Petkova, et al.,' "Proximity-Based Document Representation for Named Entity Retrieval", In Proceedings of the Sixteenth ACM Conference on Conference on Information and Knowledge Management, Nov. 6, 2007, 10 pages.

Pierce, "An Introduction to Its Physical Principles and Applications", In Acoustical Society of America, Jun. 1989, 1 page.

Ponte, et al.,' "A Language Modelling Approach to Information Retrieval", In Proceedings of the 21st Annual International ACM SIGIR Conference on Research and Development in Information Retrieval, Aug. 1, 1998, 7 pages.

Poulos, et al.,' "Assisted Viewing of Web-based Resources", U.S. Appl. No. 14/161,693, Jan. 23, 2014, 48 pages.

Raghuvanshi, "Interactive Physically-based Sound Simulation", In UMI Dissertation, Sep. 9, 2011, 187 Pages.

Raghuvanshi, et al.,' "Efficient and Accurate Sound Propagation Using Adaptive Rectangular Decomposition", In IEEE Transactions on Visualization and Computer Graphics, vol. 15, Issue 99, Feb. 13, 2009, 13 pages.

Raghuvanshi, et al.,' "Precomputed wave simulation for real-time sound propagation of dynamic sources in complex scenes", In Journal of ACM Transactions on Graphics, vol. 29, Issue 4, Jul. 26, 2010, 11 pages.

Rindel, et al.,' "The Use of Colors, Animations and Auralizations in Room Acoustics", In Internoise, Sep. 15, 2013, 9 Pages.

Roberts, et al.,' "Evaluating Passage Retrieval Approaches for Question Answering", In Proceedings of 26th European Conference on Information Retrieval, Apr. 14, 2003, 8 pages.

Robertson, et al.,' "Okapi at TREC-3", In Proceedings of Text Retrieval Conference, Jan. 24, 2014, 19 pages.

Rouillard, "Contextual QR Codes", In Proceedings of the Third International Multi-Conference on Computing in the Global Information Technology, Jul. 27, 2008, 6 pages.

Sabine, "Room acoustics", In Transactions of the IRE Professional Group on Audio, vol. 1, Issue 4, Jul. 1953, 9 pages.

Sainath, et al.,' "Auto-Encoder Bottleneck Features Using Deep Belief Networks", In Proceedings of IEEE International Conference on Acoustics, Speech and Signal Processing, Mar. 25, 2012, 4 pages.

Sainath, et al.,' "Low-Rank Matrix Factorization for Deep Neural Network Training with High-Dimensional Output Targets", In proceedings of IEEE International Conference on Acoustics, Speech and Signal Processing, May 26, 2013, 5 pages.

Sainath, et al.,' "Making Deep Belief Networks Effective for Large Vocabulary Continuous Speech Recognition", In Proceedings of IEEE Workshop on Automatic Speech Recognition and Understanding, Dec. 11, 2011, 6 pages.

Sakamoto, et al.,' "Calculation of impulse responses and acoustic parameters in a hall by the finite-difference time-domain method", In Proceedings of Acoustical Science and Technology, vol. 29, Issue 4, Feb. 2008, 10 pages.

Saluja, et al.,' "Context-aware Language Modeling for Conversational Speech Translation", In Proceedings of Machine Translation Summit XIII, Sep. 19, 2011, 8 pages.

Sarukkai, et al.,' "Improved Spontaneous Dialogue Recognition Using Dialogue and Utterance Triggers by Adaptive Probability Boosting", In Fourth International Conference on Spoken Language, vol. 1, Oct. 3, 1996, 4 pages.

Satoh, et al.,' "Poster Abstract: Ambient Sound-based Proximity Detection with Smartphones", In Proceedings of the 11th ACM Conference on Embedded Networked Sensor Systems, Nov. 11, 2013, 2 pages.

Savioja, "Real-Time 3D Finite-Difference Time-Domain Simulation of Mid-Frequency Room Acoustics", In Proceedings of the 13th International Conference on Digital Audio Effects, Sep. 6, 2010, 8 pages.

Savioja, et al.,' "Simulation of room acoustics with a 3-D finite difference mesh", In Proceedings of the International Computer Music Conference, Sep. 1994, 4 pages.

Seide, et al.,' "Conversational Speech Transcription using Context-Dependent Deep Neural Networks", In Proceeding of 12th Annual Conference of the International Speech Communication Association, Aug. 28, 2011, 4 pages.

Shah, et al.,' "All Smiles: Automatic Photo Enhancement by Facial Expression Analysis", In Proceedings of Conference on Visual Media Production, Dec. 5, 2012, 10 pages.

Shanklin, "Samsung Galaxy S4 to Feature Eye-Tracking Technology", Available at: http://www.gizmag.com/galaxy-s4-eye-tracking-technology/26503/, Mar. 4, 2013, 5 pages.

Shieh, et al.,' "Seawall: Performance Isolation for Cloud Datacenter Networks", In Proceedings of the 2nd UNENIX Conference on Hot Topics in Cloud Computing, Jun. 22, 2010, 7 pages.

Singhal, et al.,' "Pivoted Document Length Normalization", In Proceedings of the 19th Annual International ACM SIGIR Conference on Research and Development in Information Retrieval, Aug. 18, 1996, 12 pages.

Singh-Miller, et al.,' "Dimensionality Reduction for Speech Recognition Using Neighborhood Components Analysis", In Proceedings of 8th Annual Conference of the International Speech Communication Association, Antwerp, Dec. 27, 2007, 4 pages.

Siniscalchi, et al.,' "Hermitian Based Hidden Activation Functions for Adaptation of Hybrid HMM/ANN Models", In Proceedings of 13th Annual Conference of the International Speech Communication Association,, Sep. 9, 2012, 4 pages.

Starr, "Facial recognition app matches strangers to online profiles", Available at: http://www.cnet.com.au/facial-recognition-app-matches-strangers-to-online-profiles-339346355.htm, Jan. 7, 2014, 10 pages.

Stettner, et al.,' "Computer Graphics Visualization for Acoustic Simulation", In Proceedings of the 16th annual conference on Computer graphics and interactive techniques, vol. 23, No. 3, Jul. 1989, 12 pages.

Su, et al.,' "Error Back Propagation for Sequence Training of Context-Dependent Deep Networks for Conversational Speech Transcription", In IEEE International Conference on Acoustics, Speech, and Signal Processing, May 26, 2013, 5 pages.

Svensson, et al.,' "The use of Ambisonics in describing room impulse responses", In Proceedings of the International Congress on Acoustics, Apr. 2004, 4 pages.

Swietojanski, et al.,' "Revisiting Hybrid and GMM-HMM System Combination Techniques", In Proceeding of the IEEE International Conference on Acoustics, Speech and Signal Processing, May 26, 2013, 5 pages.

Takala, et al.,' "Sound rendering", In Proceedings of Siggraph Computer Graphics, Jul. 1992, 11 pages.

Taylor, et al.,' "RESound: interactive sound rendering for dynamic virtual environments", In Proceedings of the 17th ACM international conference on Multimedia, Oct. 19, 2009, 10 pages.

Tellex, et al.,' "Quantitative Evaluation of Passage Retrieval Algorithms for Question Answering", In Proceedings of the 26th Annual International ACM SIGIR Conference on Research and Development in Information Retrieval, Jul. 28, 2003, 7 pages.

Thompson, "A review of finite-element methods for time-harmonic acoustics", In Journal of Acoustical Society of America, vol. 119, Issue 3, Mar. 2006, 16 pages.

Tombros, et al.,' "Advantages of Query Biased Summaries in Information Retrieval", In Proceedings of the 21st Annual International ACM SIGIR Conference on Research and Development in Information Retrieval, Aug. 1, 1998, 9 Pages.

(56) References Cited

OTHER PUBLICATIONS

Trmal, et al.,' "Adaptation of a Feedforward Artificial Neural Network Using a Linear Transform", In Proceedings of In Text, Speech and Dialogue, Sep. 10, 2010, 8 pages.
Tsay, et al.,' "Personal Photo Organizer based on Automated Annotation Framework", In 5th International Conference on Intelligent Information Hiding and Multimedia Signal Processing, Sep. 12, 2009, 4 pages.
Valimaki, et al.,' "Fifty Years of Artificial Reverberation. Audio, Speech, and Language Processing", In IEEE Transactions on Audio, Speech, and Language Processing, vol. 20, Issue 5, Jul. 2012, 28 pages.
Van "Transform Coding of Audio Impulse Responses", In Master's Thesis of Delft University of Technology, Aug. 2003, 109 pages.
Vanhoucke, et al.,' "Improving the Speed of Neural Networks on CPUs", In Proceedings of NIPS Workshop on Deep Learning and Unsupervised Feature Learning, Dec. 16, 2011, 8 pages.
Wu, et al.,' "Adapting Boosting for Information Retrieval Measures", In Journal of Information Retrieval, vol. 13, Issue 3, Jun. 1, 2010, 17 pages.
Xu, et al.,' "User-Oriented Document Summarization through Vision-Based Eye-Tracking", In Proceedings of the 14th International Conference on Intelligent User Interfaces, Feb. 8, 2009, 10 pages.
Xue, et al.,' "Restructuring Deep Neural Network Acoustic Models", U.S. Appl. No. 13/920,323, Jun. 18, 2013, 30 pages.
Xue, et al.,' "Restructuring of Deep Neural Network Acoustic Models with Singular Value Decomposition", In Proceedings of 14th Annual Conference of the International Speech Communication Association,, Aug. 25, 2013, 5 pages.
Yan, et al.,' "A Scalable Approach to Using DSS-Derived Features in GMM-HMM Based Acoustic Modeling for LVCSR", In Proceeding of the 14th Annual Conference of the International Speech Communication Association, Aug. 25, 2013, 5 pages.
Yang, et al.,' "Qualifier in TREC-12 QA Main Task", In Proceedings of the Twelfth Text Retrieval Conference, Nov. 2003, 9 Pages.
Yao, et al.,' "Adaptation of Context-Dependent Deep Neural Networks for Automatic Speech Recognition", In IEEE Spoken Language Technology Workshop, Dec. 2, 2012, 4 pages.
Yeh, et al.,' "Wave-ray Coupling for Interactive Sound Propagation in Large Complex Scenes", In Journal of ACM Transactions on Graphics, vol. 32 Issue 6, Nov. 2013, 10 pages.
Yu, et al.,' "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, et al.,' "Improved Bottleneck Features Using Pretrained Deep Neural Networks", In Proceedings of 12th Annual Conference of the International Speech Communication Association, Aug. 28, 2011, 4 pages.
Yu, et al.,' "KL-Divergence Regularized Deep Neural Network Adaptation for Improved Large Vocabulary Speech Recognition", In IEEE International Conference on Acoustics, Speech and Signal Processing, May 26, 2013, 5 pages.
Zhai, et al.,' "A Study of Smoothing Methods for Language Models Applied to Ad Hoc Information Retrieval", In Proceedings of the 24th Annual International ACM SIGIR Conference on Research and Development in Information Retrieval, Sep. 9, 2009, 9 Pages.
Zwol, et al.,' "Prediction of Favorite Photos using Social, Visual, and Textual Signals", In Proceedings of the International Conference on Multimedia, Oct. 25, 2010, 4 pages.
"Advisory Action", U.S. Appl. No. 14/304,911, Jan. 14, 2016, 2 pages.
"Final Office Action", U.S. Appl. No. 13/923,917, Sep. 29, 2015, 6 pages.
"Final Office Action", U.S. Appl. No. 14/266,795, Apr. 11, 2016, 12 pages.
"Final Office Action", U.S. Appl. No. 14/273,100, Mar. 3, 2016, 18 pages.
"Final Office Action", U.S. Appl. No. 14/279,146, Apr. 13, 2016, 16 pages.
"Flexible Schema for Language Model Customization", U.S. Appl. No. 14/227,492, filed Mar. 27, 2014, 20 pages.
"International Preliminary Report on Patentability", Application No. PCT/US2014/041014, Sep. 15, 2015, 6 pages.
"International Preliminary Report on Patentability", Application No. PCT/US2015/024594, Mar. 24, 2016, 7 pages.
"International Preliminary Report on Patentability", Application No. PCT/US2015/027688, Apr. 26, 2016, 7 pages.
"International Preliminary Report on Patentability", Application No. PCT/US2015/022887, Apr. 7, 2016, 8 pages.
"International Search Report and Written Opinion", Application No. PCT/US2015/022886, Aug. 31, 2015, 17 pages.
"International Search Report and Written Opinion", Application No. PCT/US2015/036859, Dec. 22, 2015, 17 pages.
"Invitation to Pay Additional Fees/Partial International Search Report", Application No. PCT/US2015/033950, Feb. 23, 2016, 6 pages.
"Non-Final Office Action", U.S. Appl. No. 14/227,492, Aug. 13, 2015, 36 pages.
"Non-Final Office Action", U.S. Appl. No. 14/264,012, Mar. 10, 2016, 7 pages.
"Non-Final Office Action", U.S. Appl. No. 14/264,619, Apr. 19, 2016, 11 pages.
"Non-Final Office Action", U.S. Appl. No. 14/268,953, Apr. 19, 2016, 14 pages.
"Non-Final Office Action", U.S. Appl. No. 14/311,208, Jan. 7, 2016, 6 pages.
"Non-Final Office Action", U.S. Appl. No. 14/312,501, Dec. 16, 2015, 14 pages.
"Non-Final Office Action", U.S. Appl. No. 14/465,679, May 10, 2016, 31 pages.
"Non-Final Office Action", Application No. 147/264,619, Apr. 19, 2016, 11 pages.
"Notice of Allowance", U.S. Appl. No. 13/923,969, Oct. 1, 2015, 7 pages.
"Notice of Allowance", U.S. Appl. No. 13/923,969, Nov. 30, 2015, 5 pages.
"Notice of Allowance", U.S. Appl. No. 14/254,681, Dec. 4, 2015, 9 pages.
"Notice of Allowance", U.S. Appl. No. 14/264,012, Dec. 18, 2015, 7 pages.
"Notice of Allowance", U.S. Appl. No. 14/304,911, Feb. 19, 2016, 7 pages.
"Notice of Allowance", U.S. Appl. No. 14/311,208, Mar. 30, 2016, 8 pages.
"Notice of Allowance", U.S. Appl. No. 14/312,562, Jan. 7, 2016, 9 pages.
"Preinterview First Office Action", U.S. Appl. No. 14/444,987, Mar. 3, 2016, 4 pages.
"Ribbon Layout and Resizing", Retrieved on Mar. 12, 2014 at: https://msdn.microsoft.com/en-us/library/ff701790, 6 pages.
"Second Written Opinion", Application No. PCT/US2015/022887, Jan. 7, 2016, 5 pages.
"Second Written Opinion", Application No. PCT/US2015/026971, Mar. 30, 2016, 7 pages.
"Second Written Opinion", Application No. PCT/US2015/027409, Mar. 18, 2016, 8 pages.
"Second Written Opinion", Application No. PCT/US2015/027688, Feb. 9, 2016, 6 pages.
"Second Written Opinion", Application No. PCT/US2015/027689, Apr. 1, 2016, 8 pages.
"Second Written Opinion", Application No. PCT/US2015/028383, Apr. 18, 2016, 9 pages.
"Second Written Opinion", Application No. PCT/US2015/029334, Mar. 31, 2016, 5 pages.
"Second Written Opinion", Application No. PCT/US2015/029805, May 6, 2016, 9 pages.
"Second Written Opinion", Application No. PCT/US2015/032089, Apr. 12, 2016, 8 pages.
"Second Written Opinion", Application No. PCT/US2015/033872, Apr. 21, 2016, 6 pages.

(56) References Cited

OTHER PUBLICATIONS

"Second Written Opinion", Application No. PCT/US2015/036859, May 6, 2016, 7 pages.
"Step by Step Microsoft Word 2013", Available at: https://dbgyan.files.wordpress.com/2013/02/0735669120_wor.pdf, Mar. 1, 2013, 576 pages.
"Supplemental Notice of Allowance", U.S. Appl. No. 14/312,562, Apr. 28, 2016, 2 pages.
"The Ribbon Bar", Available at: http://bioinf.scri.ac.uk/tablet/help/ribbon.shtml, Dec. 1, 2012, 36 pages.
Gajos,"Automatically Generating Personalized User Interfaces with Supple", In Proceedings of Artificial Intelligence, vol. 174, Issue, Aug. 1, 2010, 49 pages.
Gajos,"Exploring the Design Space for Adaptive Graphical User Interfaces", In Proceedings of the Working Conference on Advanced Visual Interfaces, May 6, 2006, 8 pages.
Liu,"Language Model Combination and Adaptation using Weighted Finite State Transducers", In Proceedings of IEEE International Conference on Acoustics Speech and Signal Processing, Mar. 14, 2010, 4 pages.
Peng,"Joint and Implicit Registration for Face Recognition", Proceedings of the IEEE Computer Society Conference on Computer Vision and Pattern Recognition (CVPR'09), Jun. 2009, 8 pages.
Scarr,"Improving Command Selection with Command Maps", In Proceedings of the SIGCHI Conference on Human Factors in Computing Systems, May 2012, 10 pages.
"Final Office Action", U.S. Appl. No. 12/573,157, Feb. 17, 2015, 18 pages.
"Final Office Action", U.S. Appl. No. 12/573,157, Jul. 5, 2013, 18 pages.
"Final Office Action", U.S. Appl. No. 14/264,619, Aug. 12, 2016, 12 pages.
"Final Office Action", U.S. Appl. No. 14/456,679, Aug. 31, 2016, 33 pages.
"First Action Interview Office Action", U.S. Appl. No. 14/444,987, Aug. 24, 2016, 9 pages.
"International Preliminary Report on Patentability", Application No. PCT/US2015/026971, Aug. 10, 2016, 8 pages.
"International Preliminary Report on Patentability", Application No. PCT/US2015/035219, Jun. 23, 2016, 9 pages.
"International Preliminary Report on Patentability", Application No. PCT/US2015/032089, Jun. 29, 2016, 9 pages.
"International Preliminary Report on Patentability", Application No. PCT/US2015/027689, Jul. 18, 2016, 9 pages.
"Non-Final Office Action", U.S. Appl. No. 12/573,157, Apr. 23, 2014, 19 pages.
"Non-Final Office Action", U.S. Appl. No. 12/573,157, Aug. 20, 2015, 17 pages.
"Non-Final Office Action", U.S. Appl. No. 12/573,157, Nov. 28, 2012, 11 pages.
"Non-Final Office Action", U.S. Appl. No. 13/923,917, Jun. 30, 2016, 9 pages.
"Non-Final Office Action", U.S. Appl. No. 14/264,012, Aug. 10, 2016, 8 pages.
"Non-Final Office Action", U.S. Appl. No. 14/266,795, Jul. 19, 2016, 12 pages.
"Non-Final Office Action", U.S. Appl. No. 14/529,636, Jul. 19, 2016, 12 pages.
"Notice of Allowance", U.S. Appl. No. 12/573,157, Jun. 6, 2016, 10 pages.
"Notice of Allowance", U.S. Appl. No. 14/227,492, Aug. 4, 2016, 11 pages.
"Notice of Allowance", U.S. Appl. No. 14/265,110, Aug. 3, 2016, 22 pages.
"Notice of Allowance", U.S. Appl. No. 14/311,208, Jul. 19, 2016, 8 pages.
Astheimer,"What you see is what you hear—Acoustics applied in Virtual Worlds", In Proceedings of IEEE Symposium on Research Frontiers in Virtual Reality, Oct. 25, 1993, pp. 100-107.

Funkhouser,"Survey of Methods for Modeling Sound Propagation in Interactive Virtual Environment Systems", Retrieved from <<http://www-sop.inria.fr/reves/Nicolas.Tsingos/publis/presence03.pdf, Jan. 2003, 53 pages.
Lauterbach,"Interactive Sound Rendering in Complex and Dynamic Scenes Using Frustum Tracing", In Proceedings of IEEE Transactions on Visualization and Computer Graphics (vol. 13, Issue 6), Nov. 2007, pp. 1672-1679.
Lentz,"Virtual Reality System with Integrated Sound Field Simulation and Reproduction", In EURASIP Journal on Applied Signal Processing, Issue 1, Jan. 2007, 22 pages.
Wand,"A Real-Time Sound Rendering Algorithm for Complex Scenes", Retrieved at: <<http://web.archive.org/web/20090605124135/http://www.mpi-de/~mwand/papers/tr03.pdf>>, Jul. 2003, 13 pages.
"Final Office Action", U.S. Appl. No. 14/312,501, May 27, 2016, 13 pages.
"International Preliminary Report on Patentability", Application No. PCT/US2015/027409, Jun. 16, 2016, 9 pages.
"Non-Final Office Action", U.S. Appl. No. 14/338,078, Jun. 16, 2016, 19 pages.
"Non-Final Office Action", U.S. Appl. No. 14/456,679, May 10, 2016, 31 pages.
"Notice of Allowance", U.S. Appl. No. 14/304,911, May 23, 2016, 7 pages.
"Second Written Opinion", Application No. PCT/US2015/036587, May 18, 2016, 7 pages.
"Second Written Opinion", Application No. PCT/US2015/036595, May 31, 2016, 6 pages.
"Final Office Action", U.S. Appl. No. 14/268,953, Sep. 14, 2016, 16 pages.
"Final Office Action", U.S. Appl. No. 14/316,802, Sep. 6, 2016, 20 pages.
"International Preliminary Report on Patentability", Application No. PCT/US2015/036587, Sep. 12, 2016, 7 pages.
"International Search Report and Written Opinion", Application No. PCT/US2015/033633, Sep. 18, 2015, 11 pages.
"Non-Final Office Action", U.S. Appl. No. 14/264,619, Nov. 2, 2016, 10 pages.
"International Preliminary Report on Patentability", Application No. PCT/US2015/036595, Oct. 7, 2016, 8 pages.
"International Preliminary Report on Patentability", Application No. PCT/US2015/036859, Oct. 7, 2016, 8 pages.
"Non-Final Office Action", U.S. Appl. No. 14/316,802, Dec. 2, 2016, 22 pages.
"Notice of Allowance", U.S. Appl. No. 4/456,679, Nov. 30, 2016, 15 pages.
"Final Office Action", U.S. Appl. No. 14/266,795, Jan. 17, 2017, 11 pages.
"Final Office Action", U.S. Appl. No. 14/296,644, Jan. 12, 2017, 30 pages.
"Final Office Action", U.S. Appl. No. 14/338,078, Dec. 30, 2016, 32 pages.
"Final Office Action", U.S. Appl. No. 14/529,636, Jan. 31, 2017, 15 pages.
"Final Office Action", U.S. Appl. No. 15/076,125, Dec. 8, 2016, 6 pages.
"International Preliminary Report on Patentability", Application No. PCT/US2015/033950, Dec. 15, 2016, 14 pages.
"International Preliminary Report on Patentability", Application No. PCT/US2015/033545, Dec. 15, 2016, 8 pages.
"Non-Final Office Action", U.S. Appl. No. 14/268,953, Jan. 26, 2017, 15 pages.
"Non-Final Office Action", U.S. Appl. No. 14/273,100, Jan. 30, 2017, 14 pages.
"Notice of Allowance", U.S. Appl. No. 14/264,012, Jan. 5, 2017, 8 pages.
"Notice of Allowance", U.S. Appl. No. 14/312,501, Feb. 15, 2017, 8 pages.
"Notice of Allowance", U.S. Appl. No. 14/456,679, Nov. 30, 2016, 15 pages.

\* cited by examiner

SESSION-BASED DEVICE CONFIGURATION

BACKGROUND

Mobile computing devices have been developed to increase the functionality that is made available to users in a mobile setting. For example, a user may interact with a mobile phone, tablet computer, or other mobile computing device to check email, surf the web, write texts, interact with applications, and so on. In an enterprise setting, a user may utilize a personal mobile device to engage in enterprise-related activities, such as online meetings, content creation and/or sharing, and so forth.

While allowing a user to utilize their personal device in an enterprise setting is advantageous in terms of cost savings and convenience, it presents a number of implementation challenges. For instance, to leverage an enterprise wireless network to transmit and receive data wirelessly, a personal device typically needs to be configured with particular settings to connect and transmit data over the wireless network. Since a wide variety of different mobile devices exist with a varied assortment of capabilities and operating environments, configuring different devices with the appropriate settings can complicate users' ability to leverage their devices in an enterprise wireless network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for session-based device configuration are described. According to one or more implementations, various settings of a wireless device are configured to optimize device performance while participating in a communication session via a wireless network. The settings, for instance, are configured dynamically and on a per-session basis.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
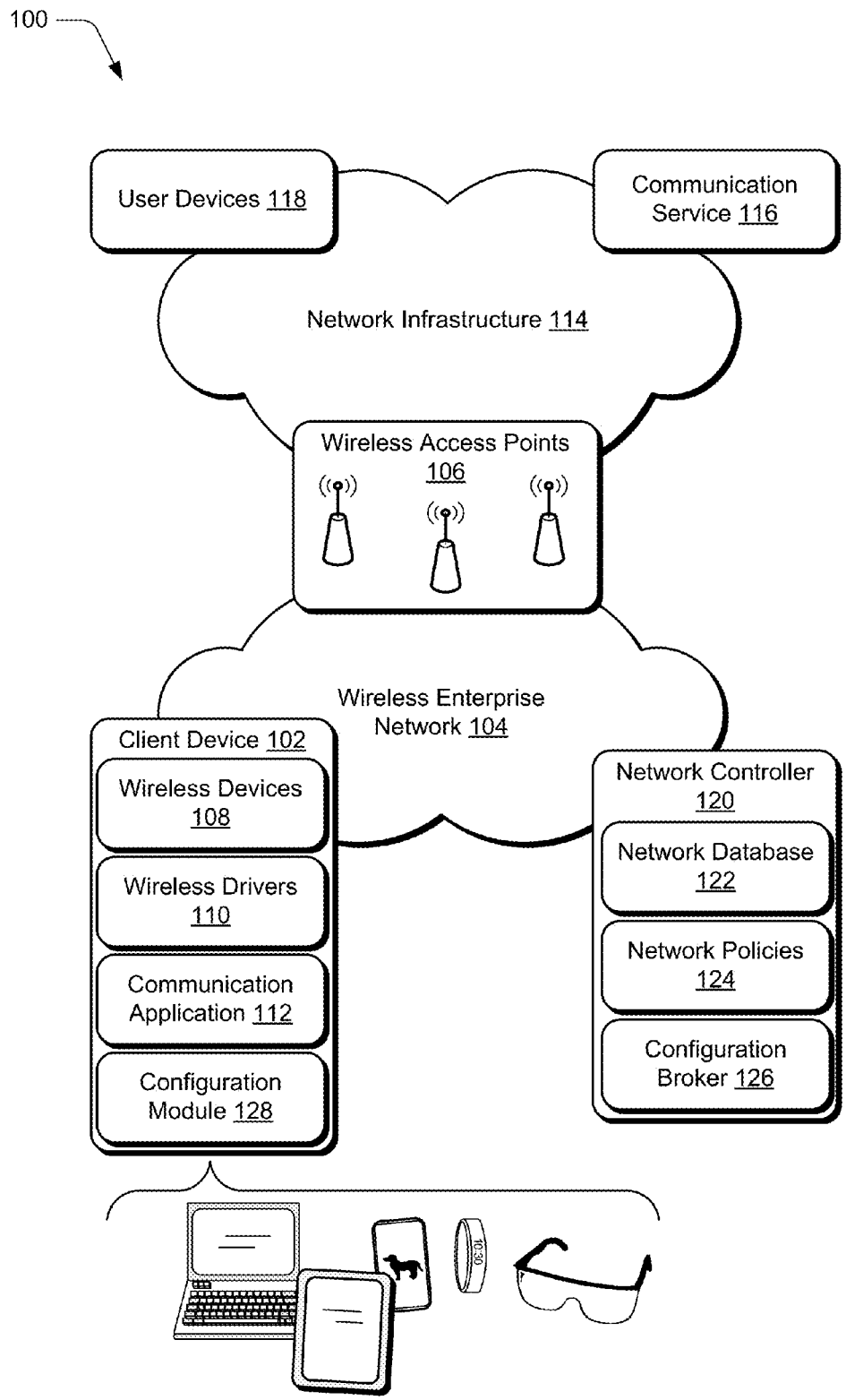
FIG. 1 is an illustration of an environment in an example implementation that is operable to employ techniques discussed herein.

Techniques for session-based device configuration are described. In at least some embodiments, a communication session refers to an exchange of communication data between different nodes in a network. Examples of a communication session include a Voice over Internet Protocol (VoIP) call, a video call, text messaging, a file transfer, and/or combinations thereof. A communication session, for instance, represents a Unified Communication and Collaboration (UC&C) session.

According to one or more implementations, various settings of a wireless device are configured to optimize device performance while participating in a communication session via an enterprise wireless network. The settings, for instance, are configured dynamically and on a per-session basis.

For instance, consider a scenario where a user device (e.g., a user's personal mobile device) connects to a wireless enterprise network managed by an enterprise entity, such as a business entity, an educational entity, a government entity, and so forth. The enterprise entity establishes various network policies that specify rules and parameters for wireless connections to the enterprise network and/or for participating in communication sessions via the enterprise network.

Further to the example scenario, while connected to the enterprise network, the user's device engages in a communication session with a different device. The different device may be connected to the enterprise network, or may be connected to a different network that communicates with the enterprise network. In response to detecting that the user device is engaging in a communication session, a network controller for the enterprise network ascertains various attributes of the user device and/or the communication session. For instance, the network controller may ascertain the attributes directly from the user device, from network elements of the enterprise network (e.g., wireless access points), and/or via a notification received from an external service.

The network controller applies the attributes to the network policies to specify different configuration parameters for the user device. The configuration parameters, for instance, specify different device settings for the user device. The network controller then generates a notification that includes the configuration parameters. As detailed below, the notification may include an application programming interface (API) that is configured with the parameters.

Further to the example scenario, the network controller communicates the notification to the user device. The user device receives the notification and processes the notification (e.g., the API) to ascertain the configuration parameters. The user device utilizes the configuration parameters to configure various settings and/or attributes of the user device. For instance, the configuration parameters are used to control various wireless-related behaviors, such as off-channel scanning, power saving procedures, wireless access point connections, and so forth.

As referenced above, a device may be configured on a per-session basis, e.g., each time a new communication session is initiated that involves the device. Thus, custom device configurations can be defined (e.g., dynamically and based on network policies) that enable devices to adapt to various network and/or device states, and to dynamically reconfigure themselves based on changes in network policies, network state, device state, and so forth.

In the following discussion, an example environment is first described that is operable to employ techniques described herein. Next, a section entitled "Propagating Session Awareness for Communication Sessions" discusses some example ways for notifying different entities of attributes of communication sessions. Following this, a section entitled "Example Network Policies" describes some example network policies in accordance with one or more embodiments. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for session-based device configuration described herein. Generally, the environment 100 includes various devices, services, and networks that enable communication via a variety of different modalities. For instance, the environment 100 includes a client device 102 connected to a wireless enterprise network (WEN) 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), a wearable computing device, and so forth.

The WEN 104 is representative of a network that provides the client device 102 with connectivity to various networks and/or services, such as the Internet. The WEN 104 may be provided and/or managed by a particular enterprise entity, such as a business entity, an educational institution (e.g., a university), a government institution, and so forth. As used herein, the term "enterprise" generally refers to an entity or group of entities that may maintain a wireless data network for various purposes. The WEN 104 may provide the client device 102 with wireless connectivity via a variety of different connectivity technologies, such as broadband cable, digital subscriber line (DSL), wireless data connectivity (e.g., WiFi™), T-carrier (e.g., T1), Ethernet, and so forth.

The WEN 104 is implemented at least in part via wireless access points (WAP) 106, which are representative of functionality to transmit and receive wireless data as part of the WEN 104. The WAP 106, for instance, provide wireless connectivity for the client device 102 and other wireless-enabled devices. The client device 102 further includes wireless devices 108, which are representative of functionalities to enable the client device 102 to transmit and receive wireless data. Example implementations of the wireless devices 108 include different types of antennas, radios, filters, receivers, transmitters, and so forth.

The wireless devices 108 are generally associated with wireless drivers 110, which are representative of functionality to enable interaction between components of the client device 102 and the wireless devices 108, and vice-versa. For instance, a communication application 112 may leverage the wireless drivers 110 to enable communication data to be transmitted and received via the wireless devices 108.

Generally, the communication application 112 is representative of functionality to enable different forms of communication via the client device 102. Examples of the communication application 112 include a voice communication application (e.g., a VoIP client), a video communication application, a messaging application, a content sharing application, and combinations thereof. The communication application 112, for instance, enables different communication modalities to be combined to provide diverse communication scenarios. According to one or more embodiments, the communication application 112 represents an application that is installed on the client device 102. Additionally or alternatively, the communication application 112 can be implemented as a remote application that is accessible via a web browser, a web application, and so forth.

The environment 100 further includes a network infrastructure 114, which is representative of different connected components that exchange, process, and/or route data among various entities. The network infrastructure 114, for instance, represents different networks and/or sub-networks that can be provided and managed by different entities, such as Internet service providers (ISP). For example, the WAP 106 are connected to the network infrastructure 114 (e.g., by a wired and/or wireless connection) to provide the WAP 106 with network connectivity, such as to the Internet, the web, other enterprise networks, and so forth.

In at least some embodiments, the network infrastructure 114 enables different forms of communication. The network infrastructure 114, for example, enables transmission and receipt of voice data, video data, content data, and so forth. In at least some embodiments, the network infrastructure 114 represents a Unified Communication and Collaboration (UC&C)-enabled network.

Connected to and/or implemented as part of the network infrastructure 114 is a communication service 116, which is representative of a service to perform various tasks for management of communication between the client device 102 and user devices 118. The communication service 116, for instance, can manage initiation, moderation, and termination of communication sessions. Examples of the communication service 116 include a VoIP service, an online conferencing service, a UC&C service, and so forth. In at least some embodiments, the communication service 116 may be implemented as or be connected to a private branch exchange (PBX) in communication with a Public Switched Telephone Network ("PSTN") to enable voice communication between the client device 102 and user devices 118.

According to one or more implementations, the client device 102 is configured to interface with the communication service 116 via the communication application 112 to enable communication between the client device 102 and the user devices 118. The communication application 112, for instance, represents a communication portal that is implemented and managed by the communication service 116 to enable various types of communication.

The environment 100 further includes a network controller 120, which is representative of functionality to manage various aspects of the WEN 104. The network controller 120, for instance, is connected to the WEN 104 and maintains state awareness of different components of the WEN 104. For example, the network controller 120 maintains a mapping of the WAP 106 (e.g., in terms of location) and performance attributes of the WAP 106, such as signal quality for the different WAP 106, quality of service (QoS) attributes of the WAP 106, and so forth. The network controller 120, for instance, may be implemented as a software-defined networking (SDN) controller for managing various aspects of the WEN 104.

According to one or more embodiments, the network controller 120 includes connectivity and logic that accesses routing information for the WEN 104. For instance, the network controller 120 can access an Interior Gateway Protocol (IGP) and/or spanning tree switching topology for the WEN 104. This enables the network controller 120 to identify different data routing paths within the WEN 104, and to map and remap the different routing paths. The network controller 120 stores this information as part of a network database 122, which is representative of functionality to track and store state information for components of the WEN 104.

The network controller 120 may augment the network database 122 with performance data from the WAP 106, such as indications of data flow quality across the individual WAP 106. As further detailed herein, this enables the network controller 120 to make decisions based on quality metrics, and to notify various entities (e.g., the client device 102) of quality metrics for the WAP 106 to enable the entities to make network connectivity decisions.

The network controller 120 further maintains network policies 124, which are representative of different rules and parameters for the WEN 104. The network policies 124, for instance, specify particular behaviors and/or settings for devices that connect to the WEN 104. Examples of different example implementations of the network policies 124 are discussed below.

The network controller 120 is configured to propagate the network policies 124 to different entities via a configuration broker 126. Generally, the configuration broker 126 is representative of functionality to interact with different wireless devices (e.g., the client device 102) to enable the devices to be configured based on the network policies 124. The client device 102, for instance, includes a configuration module 128 which is representative of functionality to interact with the configuration broker 126 and/or other functionalities to enable configuration of the client device 102 for wireless communication via the WEN 104.

For example, the configuration broker 126 can communicate various attributes of the network policies 124 to the configuration module 128. The configuration module 128 can cause the client device 102 to be configured according to the attributes, such as to optimize wireless performance of the client device 102. The configuration module 128 may be implemented in a variety of ways, such as via software, firmware, hardware, and/or combinations thereof. According to one or more implementations, the configuration module 128 can be implemented as a physical layer (PHY) and/or media access control (MAC) layer component of the client device 102. Thus, various techniques discussed herein may be implemented at the PHY and/or MAC layer to configure the client device 102 for a communication session.

The network controller 120 may also enable the WAP 106 to be configured for different communication sessions. For instance, various notifications and operations discussed herein with reference to the client device 102 may also be utilized to notify the WAP 106 of communication session attributes and policies to enable the WAP 106 to be configured for particular communication sessions.

In at least some embodiments, configuration of the client device 102 according to the network policies 124 can occur on a per-session basis, e.g., each time the client device 102 participates in a communication session with another device. Further details concerning configuration of the client device 102 according to different network policies 124 and/or session attributes are discussed below.

According to one or more implementations, the network controller 120 maintains active state awareness of various devices connected to the WEN 104, state conditions of the WEN 104, and of communication sessions that involve the WEN 104. For instance, the network database 122 tracks connectivity attributes of different devices and components within the WEN 104. The network database 122, for example, includes records for active communication sessions and dynamically updates the records, such as based on changes in routing path, changes in connection quality, and so forth. In at least some embodiments, quality metrics from the network database 122 can be used to issue notifications to the client device 102 that enable the client device 102 to adjust to various state changes. Further details and implementations of the various entities of the environment 100 are discussed below.

Having described an example environment in which the techniques described herein may operate, consider now a discussion of example ways of propagating various attributes of communication sessions and network policies in accordance with one or more embodiments.

Propagating Session Awareness for Communication Sessions

According to various embodiments, techniques can be employed to dynamically enlighten various network components with information about communication sessions. For instance, notification events can be generated that include various attributes of communication sessions. The notification events can be propagated to different entities further to techniques for session-based device configuration discussed herein.

In at least some embodiments, notification events can be configured using a communication application programming interface (API) that can be leveraged to configure and communicate session information to various network components involved in a communication session. For example, the communication API can identify dialogue events and session events which can be populated with respective values for a particular communication session. Consider, for instance, the following events and attributes that may be conveyed via a notification event generated by the communication API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying network policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, a network policy applied to the communication session, and so forth.

(9) To: This attribute can be leveraged to identify a user to which media in a communication session is to be transmitted.

(10) From: This attribute can be leveraged to identify a user from which media in a communication session is transmitted.

(11) Error Code: This attribute can be leveraged to specify various error codes for errors that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate the attributes to various entities. Elements from the communication API discussed above, for example, can be configured based on network policies and attributes of a communication session. For instance, attributes of a particular communication session can be applied to network policies to configure elements of the communication API. The configured elements can be communicated to a device (e.g., the client device 102) to enable the device to be configured based on values from the communication API elements.

Having described an example ways of propagating session awareness for communication sessions, consider now some example network policies in accordance with one or more embodiments.

Example Network Policies

The following section describes example network policies (e.g., network policies 124) in accordance with one or more embodiments. As referenced above, network policies generally specify various rules and parameters for connecting to a wireless network, and for transmitting and receiving data via the wireless network.

Off-Channel Scanning

Generally, off-channel scanning refers to scanning for available wireless network channels. For instance, a device may scan for available wireless channels in attempt to maintain channel awareness in an event that a wireless channel is required.

An example network policy can specify that when a communication session is in progress, off-channel scanning is to be halted and/or minimized. For instance, a network policy may specify that off-channel scanning is not to be performed while a communication session is in progress. Alternatively, a network policy may specify a maximum amount of time during which off-channel scanning may be performed while a communication session is in progress, e.g., 30 milliseconds, 60 milliseconds, and so forth.

In at least some embodiments, a notification event can be sent to a client device notifying the device that the device is currently participating in a communication session, and thus off-channel scanning is to be halted or minimized. The notification event, for instance, can include attributes of the communication API introduced above. When the communication event is terminated, a notification event (e.g., based on the communication API) can be sent to the client device notifying the device that the communication event is terminated, and thus off-channel scanning may resume according to default settings.

Wireless Mobility

Mobile devices often move between different locations. When a mobile device moves while connected to a wireless network, the mobile device may transfer its network connection between different WAP. For instance, if a user is participating in a communication session with a mobile device while walking between areas of an enterprise facility, handoffs may occur between different WAP to enable the communication session to continue and to maintain an acceptable signal quality.

According to various implementations, network policies can be employed to optimize connection handoff between different WAP. For instance, the network controller 120 can maintain various state information for components of the WEN 104. Examples of such state information include:

(1) An identifier for a current WAP to which the client device 102 is connected.

(2) A location of the client device 102. The location, for instance, can be determined relative to a WAP to which the client device 102 is connected.

(3) Direction of movement of the client device 102. For instance, the network controller 120 can determine that the client device 102 is moving in a particular direction, such as relative to an associated WAP. In at least some embodiments, this information can be received from a WAP that detects movement of the client device 102 in a general direction.

(4) Signal quality attributes of a current connection of the client device 102 to a WAP. Examples of signal quality attributes include signal-to-noise ratio (SNR), received signal strength indicator (RSSI), jitter, packet delay, wireless congestion, and so forth.

(5) Signal quality attributes of other WAP of the WEN 104. The attributes, for instance, can be determined from the WAP themselves, and/or from connected devices.

(6) Locations of other WAP. The network controller 120, for instance, may maintain a map of WAP locations. Further, the map may be augmented with signal quality attributes of the individual WAP such that the network controller 120 maintains a mapping of wireless availability and quality in different locations.

The network controller 120 can utilize this information to enable intelligent decisions to be made regarding access point candidates. For instance, the network controller 120 can identify a best-candidate WAP for the client device 102, e.g., based on location proximity to the client device 102 and signal quality. The network controller 120 can then send a notification event (e.g., using the communication API) to the client device 102 instructing the client device 102 to establish a connection with the WAP.

Alternatively or additionally, the network controller 120 can provide a list of best-candidate WAP to the client device 102, and the client device 102 can employ internal decision-making logic to select a WAP from the list with which to connect.

According to various implementations, this process can occur dynamically and continuously. For instance, the network controller 120 can periodically and/or continuously update its WAP state awareness. Further, the network controller 120 can periodically and/or continuously update the client device 102 regarding best-candidate WAP for wireless data transmission.

Battery Power and Wireless Performance

Mobile devices often implement battery-saving procedures when operating under battery power. For instance, when disconnected from an alternating current (AC) source, to conserve battery life a mobile device may lower the amount of power used to transmit wireless data. However, reducing the amount of power to a wireless functionality (e.g., the wireless devices 108) may adversely affect wireless signal quality.

Accordingly, a network policy 124 may specify that while a communication session is in progress, power supplied to wireless functionalities is not to be reduced. In at least some implementations, this network policy can override a default device setting that attempts to reduce power for wireless data transmission when a device is operating on battery power.

The network controller 120, for example, can send a notification event to the client device 102 (e.g., using the communication API) indicating that a communication session is in progress, and thus power supplied to wireless functionality is not to be reduced. When the communication session terminates, the network controller 120 can send a notification event to the client device 102 indicating that the communication session has terminated. Thus, the client device may resume default power saving procedures, such as reducing power supplied to wireless functionality.

Wireless Rate Adaption

Mobile devices may implement rate adaption procedures to compensate for problems in signal quality, such as may occur in areas with noise sources that generate RF interference. Generally, rate adaption refers to a process of reducing a transmission bit rate while increasing transmission power for data transmission. However, typical rate adaption algorithms may adversely affect wireless signal quality. For instance, some rate adaption algorithms cause increases in packet transmission retries and retransmissions, which may cause a receiving device to drop packets as the time sequence to play out media from a communication session expires.

Accordingly, a network policy 124 may specify that while a communication session is in progress, a default rate adaption algorithm is to be overridden with a custom rate adaption algorithm. The custom rate adaption algorithm, for instance, may specify that packet retransmissions and transmission retries are to be reduced from default levels Implementation of the custom rate adaption algorithm may reduce the likelihood that unnecessary packet retransmissions and transmission retries are performed by a transmitting device.

The network controller 120, for example, can send a notification event to the client device 102 (e.g., using the communication API) indicating that a communication session is in progress, and thus a custom rate adaption algorithm is to be implemented if rate adaption is to be performed. When the communication session terminates, the network controller 120 can send a notification event to the client device 102 indicating that the communication session has terminated. Thus, the client device may resume default rate adaption procedures.

Quality of Service

According to various implementations, wireless packets that are transmitted may be associated with quality of service (QoS) markings that specify how that packets are to be treated by various network elements. Examples of QoS markings include expedited forwarding, assured forwarding, best effort, and so forth. For instance, a differentiated services code point (DSCP) field in an IP packet can be configured based on different QoS levels to enable different levels of service to be assigned to network traffic. Typical solutions for QoS markings, however, rely on per-packet QoS marking.

Accordingly, a network policy 124 may specify particular QoS levels that are to be applied to transmission of different data packets. The network controller 120, for example, can send a notification event to the client device 102 (e.g., using the communication API) indicating that a communication session is in progress, and thus a particular QoS level is to be applied to packets that are transmitted by the client device 102. The notification event, for instance, is out-of-band from the actual media packets of the communication session. The notification may include actual tags to be applied to the data packets, regardless of how the data packets may be tagged when they are received for transmission. Thus, a QoS level specified by the notification event for packets of a communication session may override a QoS marking attached to the packets. Thus, embodiments discussed herein provide ways of dynamically configuring QoS for communication sessions, such as on a per-session basis.

Channel Quality

As discussed above, state information regarding different WAP can be maintained, such as location and signal quality for different WAP. Thus, if the client device 102 experiences signal quality degradation with a current WAP, the client device 102 can be informed of candidate replacement WAP. The network controller 120, for example, can send a notification event to the client device 102 (e.g., using the communication API) identifying a candidate WAP and/or wireless channels that the client device 102 may associate with to increase signal quality. In at least some implementations, this can circumvent the need for the client device to perform channel search procedures, such as off-channel scanning.

Having described some example network policies, consider now some example implementation scenarios for session-based device configuration in accordance with one or more embodiments.

Example Implementation Scenarios

The following section describes example implementation scenarios for session-based device configuration in accordance with one or more embodiments. The implementation scenarios may be implemented in the environment 100 discussed above, and/or any other suitable environment.

Figure 2:
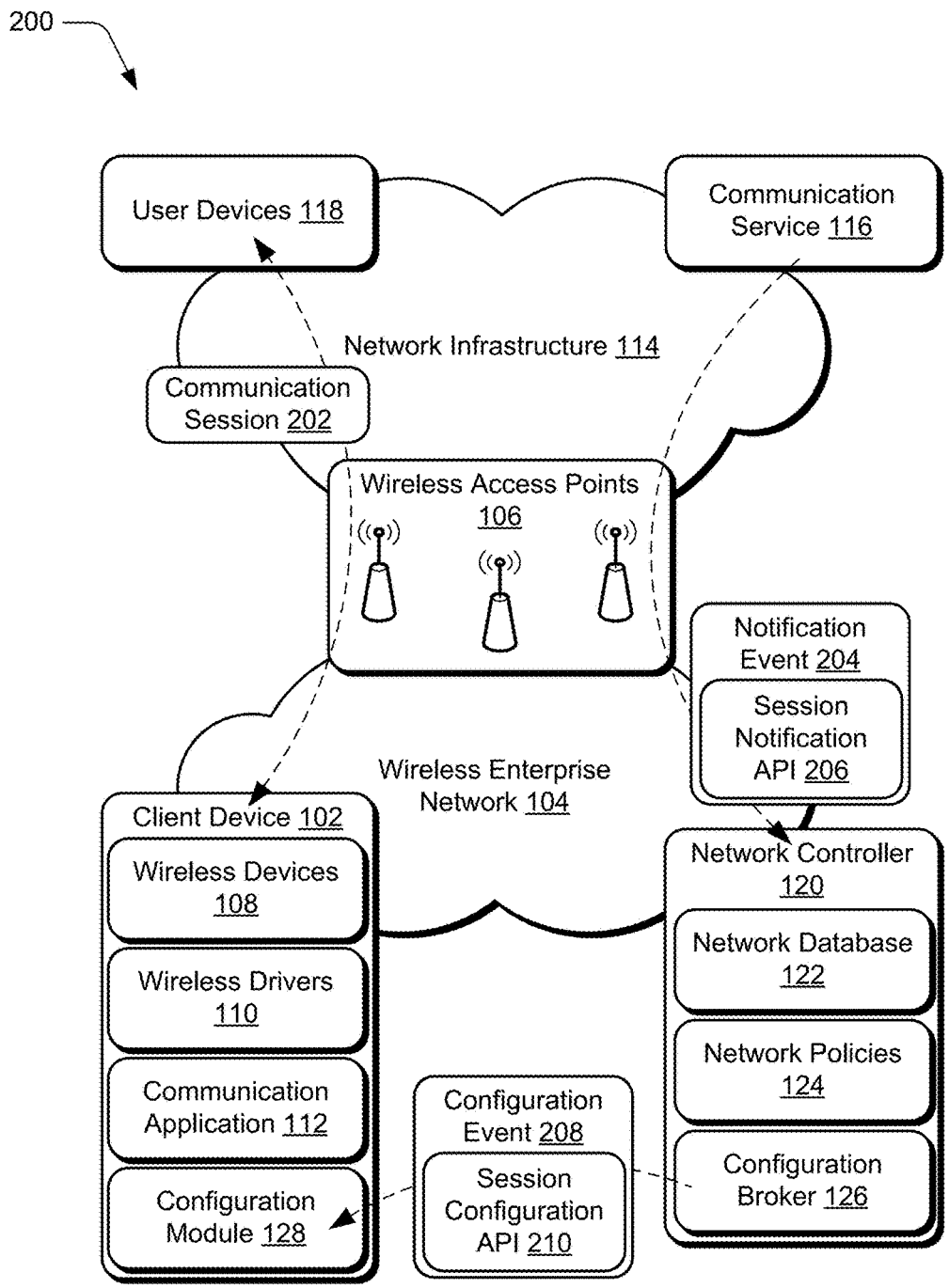
FIG. 2 illustrates an example implementation scenario for initiating a communication session in accordance with one or more embodiments.

FIG. 2 illustrates an example implementation scenario for initiating a communication session generally at 200. The scenario 200 includes various entities and components introduced above with reference to the environment 100.

In the scenario 200, a communication session 202 is initiated between the client device 102 and the user device 118 via the communication service 116. The communication service 116, for instance, serves as an intermediary between the communication application 112 of the client device 102, and the user device 118. For example, the communication service 116 may manage various aspects of initiation, moderation, and termination of the communication session 202.

The communication session 202 may include various types of communication media, such as voice, video, and/or combinations thereof. While the user device 118 is illustrated as being connected outside of the WEN 104, in alternative implementations the client device 102 and the user device 118 may be connected directly to the WEN 104.

In response to initiation of the communication session 202, the communication service 116 generates a notification event 204 and sends the notification event 204 to the network controller 120. The notification event 204 notifies the network controller 120 that the communication session 202 is initiated. The notification event 204 includes a session notification API 206, which represents an implementation of the communication API detailed above.

Further to the scenario 200, the session notification API 206 includes values for various attributes of the communication session 202. Examples of such attributes include identifiers for the client device 102 and the user device 118, such as IP addresses, media access control (MAC) addresses, and so forth. The attributes may further include attributes of the communication session itself, such as a type or types of media being transferred during the communication session, a start time of the communication session, an application ID for the communication application 112, and so forth. Examples of other attributes that may be communicated with the session notification API 206 are detailed above, such as in the discussion of the example communication API and the example network policies.

Thus, based on information from the session notification API (e.g., an ID for the client device 102), the network controller 120 ascertains that the client device 102 is connected to a network domain of the network controller 120. Accordingly, the network controller 120 generates a configuration event 208 that includes a session configuration API 210. The session configuration API 210, for instance, is configured by applying values from the session notification API 206 to the network policies 124.

Further to the scenario 200, the network controller 120 communicates the configuration event 208 to the client device 102 via the WEN 104. For instance, the configuration broker 126 interacts with the configuration module 128 to communicate the configuration event 208. The configuration module 128 includes functionality to consume the session configuration API 210, extract information from the API, and to configure various attributes of the client device 102 based on attributes and values included in the session configuration API 210. For instance, the configuration module 128 can propagate information from the session configuration API 210 to different functionalities of the client device 102 to enable the client device 102 to operate according to the network policies 124, e.g., while engaging in the communication session 202.

As an example, consider that the wireless driver 110 is configured by default to perform periodic off-channel scanning to identify available wireless channels. According to the scenario 200, the session configuration API 210 includes an indication that the client device is either to halt off-channel scanning during the communication session 202, or is to limit the amount of time during which off-channel scanning is performed. The configuration module 128 can read this information from the session configuration API 210, and communicate the information to the wireless driver 110. Thus, the wireless driver 110 may operate according to this policy to limit or stop off-channel scanning while the communication session 202 is active.

This example policy is presented for purpose of example only, and it is to be appreciated that a wide variety of different policies and behaviors can be enforced utilizing techniques discussed herein. Examples of other policies and behaviors that may be utilized are discussed above.

Figure 3:
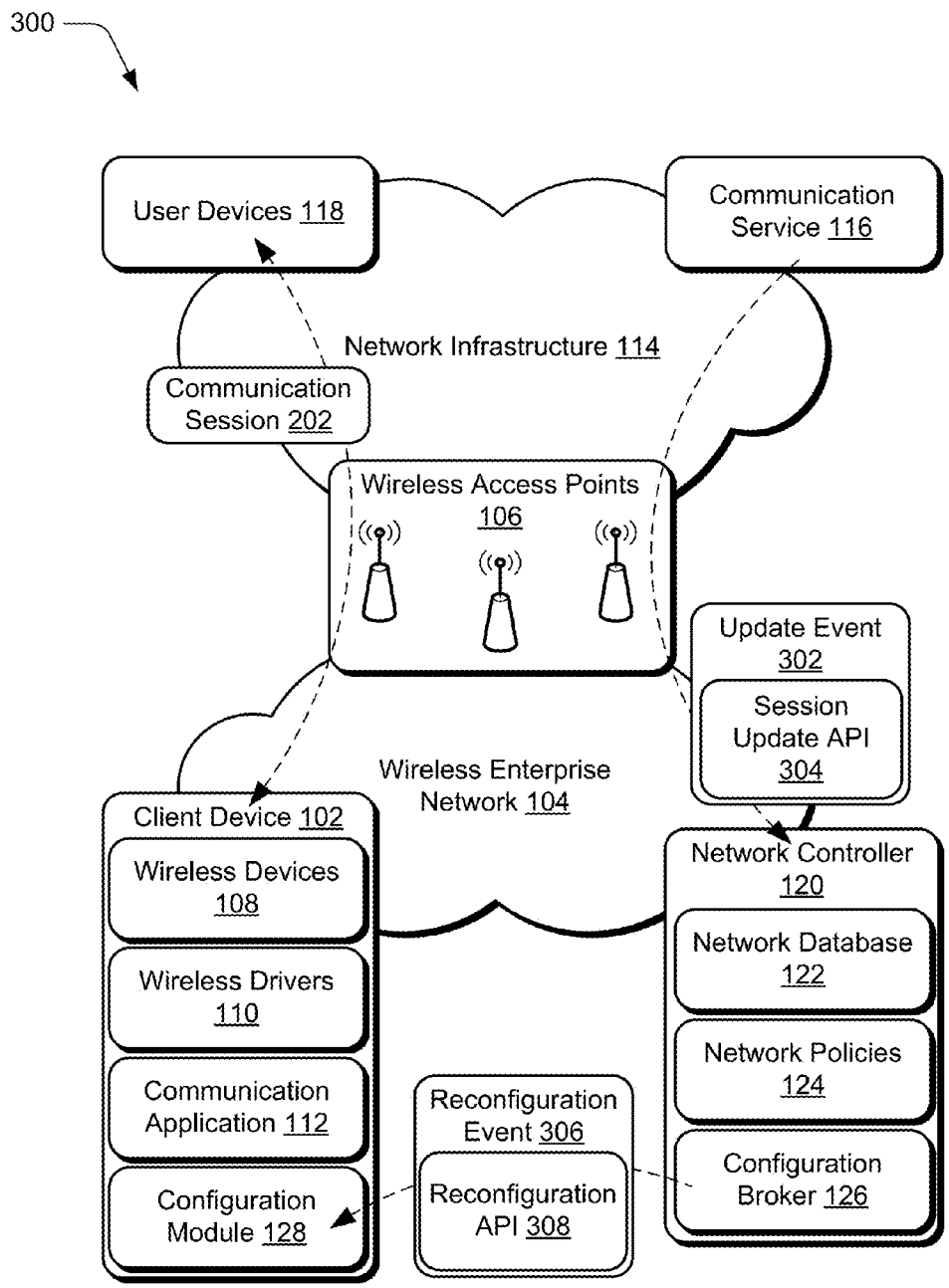
FIG. 3 illustrates an example implementation scenario for updating session awareness in accordance with one or more embodiments.

FIG. 3 illustrates an example implementation scenario for updating session awareness, generally at 300. The scenario 300 includes various entities and components introduced above with reference to the environment 100. In at least some embodiments, the scenario 300 represents a continuation of the scenario 200, discussed above.

In the scenario 300, the communication service 116 detects one or more changes in the communication session 202. For instance, the communication service 116 may receive an indication from the client device 102 and/or the user device 118 of a problem with session quality of the communication session 202. Examples of session quality problems include lower than acceptable S/N ratio, low signal strength, too much jitter, too many dropped packets, and so forth.

In response to the indication of session quality problems, the communication service 116 generates an update event 302 that includes a session update API 304. The session update API 304, for instance, represents an implementation of the communication API detailed above. The communication service 116 sends the update event 302 to the network controller 120. The update event 302 notifies the network controller 120 of a change in the communication session 202, e.g., of signal problems with the communication session.

Further to the scenario 300, the session update API 304 includes values for various attributes of the communication session 202. Examples of such attributes include identifiers for the client device 102 and the user device 118, such as IP addresses, media access control (MAC) addresses, and so forth. The attributes may further include a session ID for the communication session and an indication of the change to the communication session. Examples of other attributes that may be communicated with the session update API 304 are detailed above, such as in the discussion of the example communication API and the example network policies.

Thus, based on information from the session update API 304, the network controller 120 ascertains that a problem is occurring with the communication session 202. The session update API 304, for instance, may indicate that signal quality for a WAP 106 to which the client device 102 is connected is poor.

Accordingly, the network controller 120 generates a reconfiguration event 306 that includes a reconfiguration API 308. The reconfiguration API 308, for instance, is configured by applying values from the session update API 304 to the network policies 124. In at least some embodiments, the reconfiguration API 308 may identify candidate WAP 106 that have better signal quality than a current WAP 106 to which the client device 102 is connected.

Further to the scenario 300, the network controller 120 communicates the reconfiguration event 306 to the client device 102 via the WEN 104. For instance, the configuration broker 126 interacts with the configuration module 128 to communicate the reconfiguration event 306. The configuration module 128 includes functionality to consume the reconfiguration API 308, extract information from the API, and to configure various attributes of the client device 102 based on attributes and values included in the reconfiguration API 308. For instance, the configuration module 128 can propagate information from the reconfiguration API 210 to different functionalities of the client device 102 to enable the client device 102 to operate according to the network policies 124, e.g., while engaging in the communication session 202.

In at least some embodiments, based on a candidate WAP 106 identified in the reconfiguration API 308, the client device 102 initiates a handoff procedure to disconnect from a current WAP 106 and to connect to a different WAP 106. Thus, signal quality for the communication session 202 may be increased by connecting to a WAP 106 with higher signal quality.

While the scenario 300 is discussed with reference to the reconfiguration event 306 being generated in response to the update event 302, this is not intended to be limiting. For instance, in at least some embodiments the network controller 120 maintains its own session and/or network awareness independent of the communication service 116. Thus, the network controller 120 can detect changes in network and/or session attributes, and can generate a reconfiguration event and reconfiguration API to notify the client device 102 of the changes and appropriate configuration settings for the client device 102 based on the changes. The network controller 120, for instance, can generate the reconfiguration event 306 and the reconfiguration API 308 based on its own state awareness and independent of a notification from an external entity such as the communication service 116.

Accordingly techniques discussed herein can be employed to dynamically update communication session awareness while a communication session is in progress. Further, update events and reconfiguration events may be issued multiple times during a particular communication session, thus enabling participating devices to be dynamically reconfigured to adapt to changes in session quality and/or session attributes.

Figure 4:
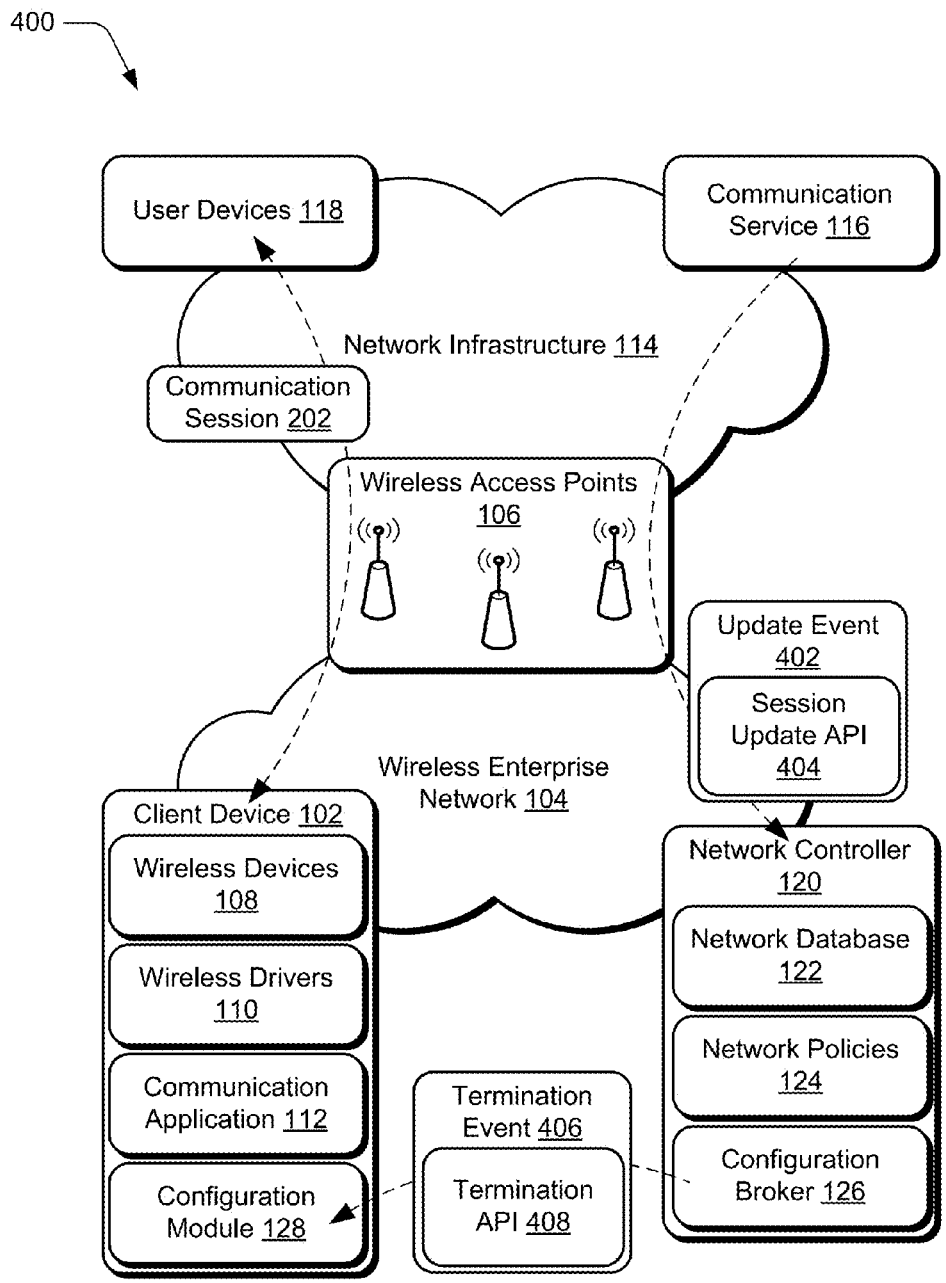
FIG. 4 illustrates an example implementation scenario for session termination in accordance with one or more embodiments.

FIG. 4 illustrates an example implementation scenario for session termination, generally at 400. The scenario 400 includes various entities and components introduced above with reference to the environment 100. In at least some embodiments, the scenario 400 represents a continuation of the scenarios 200 and 300, discussed above.

In the scenario 400, the communication service 116 detects that the communication session 202 has terminated. For instance, the communication service 116 may receive an indication from the client device 102 and/or the user device 118 that the communication session 202 has ended.

In response to the indication of session termination, the communication service 116 generates an update event 402 that includes a session update API 404. The session update API 404, for instance, represents an implementation of the communication API detailed above. The communication service 116 sends the update event 402 to the network controller 120. The update event 402 notifies the network controller 120 that the communication session 202 has ended.

Further to the scenario 400, the session update API 404 includes values for various attributes of the communication session 202. Examples of such attributes include identifiers for the client device 102 and the user device 118. The attributes may further include a session ID for the communication session 202 and a session end timestamp for the communication session 202. Examples of other attributes that may be communicated with the session update API 404 are detailed above in the discussion of the example communication API.

Thus, based on information from the session update API 404, the network controller 120 ascertains that the communication session 202 has ended. Accordingly, the network controller 120 generates a termination event 406 that includes a termination API 408. The termination API 408, for instance, is configured by applying values from the session update API 404 to the network policies 124. In at least some embodiments, the termination API 408 identifies the communication session 202 and specifies that the communication session has ended.

Further to the scenario 400, the network controller 120 communicates the termination event 406 to the client device 102 via the WEN 104. For instance, the configuration broker 126 interacts with the configuration module 128 to communicate the termination event 406. The configuration module 128 includes functionality to consume the termination API 408 and to configure various attributes of the client device 102 based on attributes and values included in the termination API 408. For instance, the configuration module 128 can propagate information from the termination API 408 to different functionalities of the client device 102 to enable the client device 102 to operate according to the network policies 124.

In at least some embodiments, based on an indication that the communication session 202 is terminated, the client device 102 may notify its various components that they may resume default behavior. For instance, the configuration module 128 may notify the wireless drivers 110 that default behaviors may be resumed, such as with reference to off-channel scanning, battery conservation techniques, wireless rate adaption algorithms, and so forth.

Accordingly techniques discussed herein can be employed to notify devices of session start and stop events, and to dynamically configure device attributes on a per-session basis.

Having discussed some example implementation scenarios, consider now a discussion of some example procedures in accordance with one or more embodiments.

Example Procedures

The following discussion describes some example procedures for session-based device configuration in accordance with one or more embodiments. The example procedures may be employed in the environment 100 of FIG. 1, the system 900 of FIG. 9, and/or any other suitable environment. Further, the example procedures may represent implementations of the example scenarios discussed above. In at least some embodiments, steps described for the various procedures can be implemented automatically and independent of user interaction.

Figure 5:
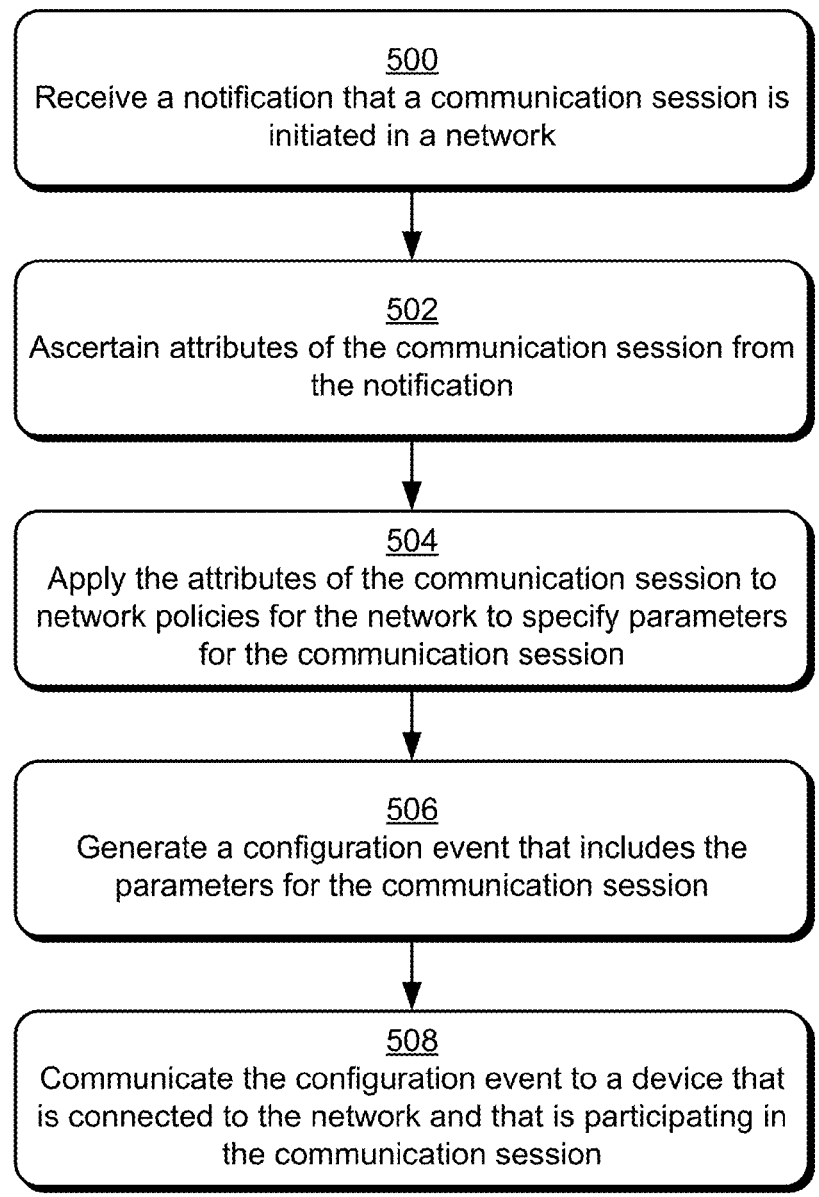
FIG. 5 is a flow diagram that describes steps in a method for applying network policies to a communication session in accordance with one or more embodiments.

FIG. 5 is a flow diagram that describes steps in a method in accordance with one or more embodiments. The method describes an example procedure for applying network policies to a communication session in accordance with one or more embodiments. In at least some implementations, the method can be performed by the network controller 120.

Step 500 receives a notification that a communication session is initiated in a network. The notification, for instance, includes various attributes of the communication session. For example, the notification may be configured via the communication API detailed above. Examples of attributes and information that may be communicated via the notification are described above.

Step 502 ascertains attributes of the communication session from the notification. For example, the network controller 120 can process the notification to identify session attributes, such as from a communication API included with the notification.

Step 504 applies the attributes of the communication session to network policies for the network to specify parameters for the communication session. For instance, different policy-based decisions can be made based on the attributes. Examples of network policies are detailed above.

Step 506 generates a configuration event that includes the parameters for the communication session. The configuration event, for instance, includes a communication API that is populated with various values that represent the parameters for the communication session. Examples of such parameters include behaviors for a device that is participating in the communication session, such as whether to engage in off-channel scanning during the communication session, allowed power conservation techniques during the communication session, QoS marking to be applied to session packets, and so forth.

Step 508 communicates the configuration event to a device that is connected to the network and that is participating in the communication session. In at least some embodiments, information from the configuration event enables the device to configure itself to operate according to the parameters for the communication session.

With reference to the environment 100 and the scenarios discussed above, the network controller 120 can communicate the configuration event to the client device 102. Alternatively or additionally, the network controller 120 can communicate the configuration event to other network elements, such as the WAP 106. For instance, techniques discussed herein may be employed to configure the WAP 106 and/or other network components and network elements, and are not limited to configuration of end-user devices.

Figure 6:
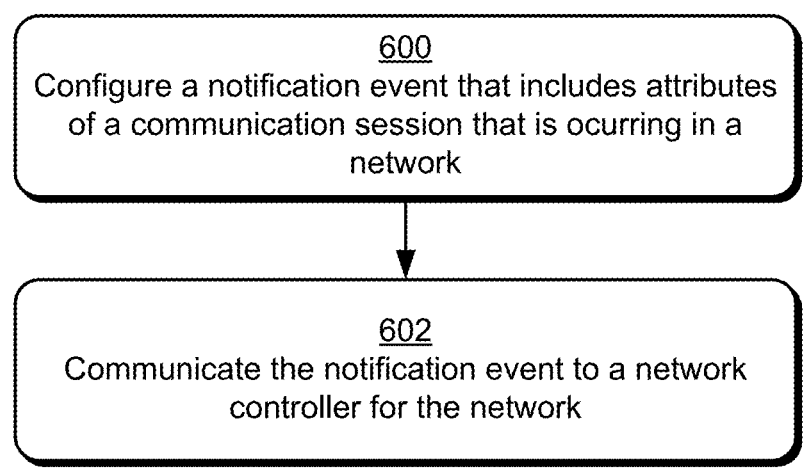
FIG. 6 is a flow diagram that describes steps in a method for notifying an entity of communication session attributes in accordance with one or more embodiments.

FIG. 6 is a flow diagram that describes steps in a method in accordance with one or more embodiments. The method describes an example procedure for notifying an entity of communication session attributes in accordance with one or more embodiments.

Step 600 configures a notification event that includes attributes of a communication session that is occurring in a network. The communication service 116, for instance, populates a communication API with attributes of a communication session. Examples of communication API and communication session attributes are detailed above. In at least some embodiments, the attributes may include attributes of a communication session that was recently initiated, and/or changes to attributes of an existing communication session.

Step 602 communicates the notification event to a network controller for the network. The communication service 116, for instance, communicates the populated communication API to the network controller 120. The notification event may include attributes of a new communication session, and/or changes to attributes of an existing communication session. As detailed herein the network controller 120 can utilize information from the communication API to apply network policies and notify various devices of parameters and behaviors to be applied for a communication session.

Figure 7:
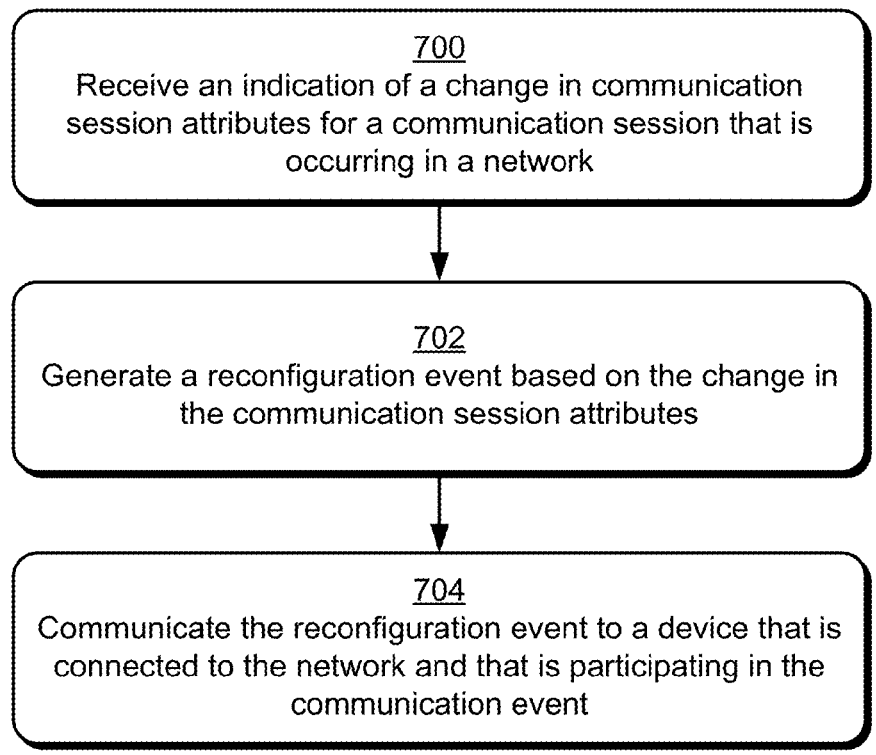
FIG. 7 is a flow diagram that describes steps in a method for notifying a device of a change in communication session attributes in accordance with one or more embodiments.

FIG. 7 is a flow diagram that describes steps in a method in accordance with one or more embodiments. The method describes an example procedure for notifying a device of a change in communication session attributes in accordance with one or more embodiments.

Step 700 receives an indication of a change in communication session attributes for a communication session that is occurring in a network. The network controller 120, for example, receive an indication that one or more attributes of a communication session have changed. Examples of such a change include a change in session quality, a change in device location, a change in device performance (e.g., for the client device 102 and/or a WAP 106), and so forth. The indication of the change may be received from the communication service 116 and/or based on detected state conditions for the network.

Step 702 generates a reconfiguration event based on the change in the communication session attributes. The network controller 120, for instance, applies the changed attributes to the network policies 124 to generate a session update API for the communication session. The session update API, for instance, includes element values that reflect the change in the communication session attributes as applied to the network policies 124.

In at least some embodiments, the reconfiguration event may identify WAP 106 that are candidates to provide a wireless connection. The candidates may be identified based on signal quality for the individual WAP 106 and/or location for the individual WAP 106. For instance, if the change in the communication session attributes indicates a change in session quality, the reconfiguration event can identify WAP 106 in a particular region that have a higher signal quality than a currently-connected WAP.

Alternatively or additionally, if the change in the communication session attributes indicates that a device (e.g., the client device 102) is moving from one location to another, the reconfiguration event can identify WAP 106 that occur in the general direction of movement and that are available to provide wireless connectivity. Thus, a device that receives the reconfiguration event can process data from the event and select a WAP 106 with which to associate, such as to improve signal quality during a communication event and/or enable the communication event to continue when moving between locations.

Step 704 communicates the reconfiguration event to a device that is connected to the network and that is participating in the communication event. The network controller 120, for instance, communicates the reconfiguration event to the client device 102. Based on information from the communication event, the client device 102 can change its internal settings, can connect to a different WAP 106, and so forth.

Figure 8:
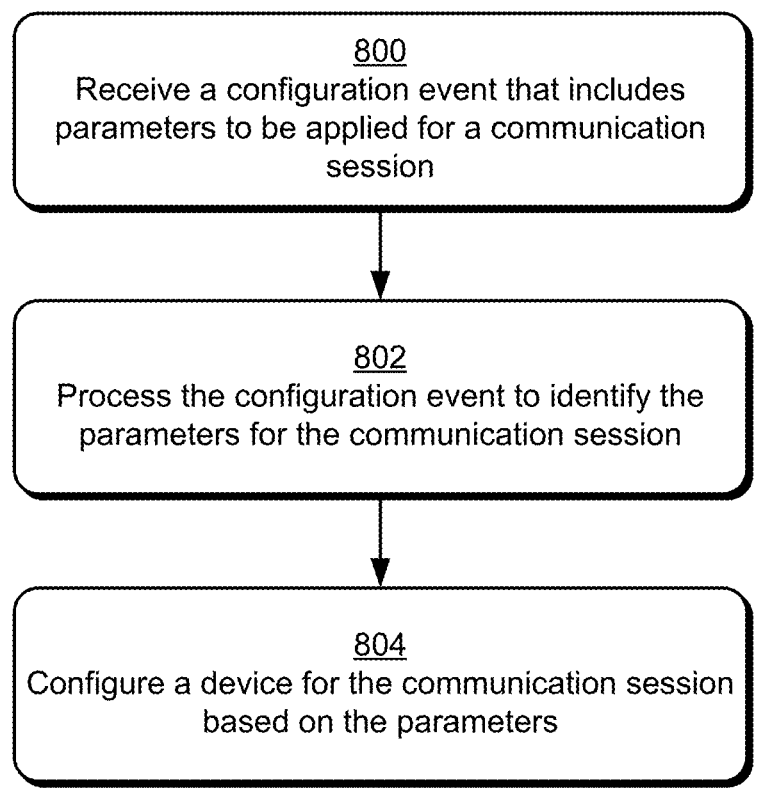
FIG. 8 is a flow diagram that describes steps in a method for configuring a device to participate in a communication session in accordance with one or more embodiments.

FIG. 8 is a flow diagram that describes steps in a method in accordance with one or more embodiments. The method describes an example procedure for configuring a device to participate in a communication session in accordance with one or more embodiments.

Step 800 receives a configuration event that includes parameters to be applied for a communication session. The client device 102, for instance, receives the configuration event from the network controller 120. In at least some embodiments, the configuration event may be an initial configuration event, e.g., a first configuration event that is received after initiation of a communication session. Alternatively, the configuration event may be a reconfiguration event that is received during a communication session and subsequent to a previously-received configuration event for the communication session. According to various implementations, the configuration event is received after the client device 102 has begun participating in the communication session.

Step 802 processes the configuration event to identify the parameters for the communication session. The configuration event, for example, includes a communication API that is populated with different values for different session parameters and/or device settings. The client device 102 may process the communication API to expose the different parameters for the communication session.

Step 804 configures a device for the communication session based on the parameters. The client device 102, for instance, can configure various device settings based on the parameters. For example, the configuration module 128 can communicate various parameters and/or settings to the wireless drivers 110 to enable the wireless drivers 110 to control the wireless devices 108 according to the parameters and settings. Examples of different device settings and attributes that can be configured are discussed above, and include off-channel scan settings, power conservation settings, QoS marking to be applied to communication session packets, and so forth.

A device may be configured as part of an initial configuration of the device for a communication session and/or as part of a configuration update. For instance, the parameters may include updates to previously configured settings and device attributes, such as received as part of a reconfiguration event. Thus, previously-applied settings and attributes for a device participating in a communication session may be updated for the communication session, such as to reflect changes in the communication session.

As referenced above in the discussion of environment 100, the configuration module 128 can be implemented as a PHY and/or MAC layer component of the client device 102. Aspects of the various procedures discussed above, for instance, may be implemented at the PHY and/or MAC layer to configure a device for a communication session. For example, processing of the communication API may occur at the PHY and/or MAC layer to enable various device parameters and settings to be configured for a communication session.

While the method discussed above is described with reference to configuration a user device (e.g., the client device 102) for a communication session, this is not intended to be limiting. For instance, in at least some embodiments, network components such as wireless access points, network firewalls, and so forth, may be configured utilizing techniques discussed herein. Different events and APIs discussed herein, for example, may be communicated to different network components to enable the components to be configured for particular communication sessions. Configuration of network components may occur additionally or alternatively to configuration of an end-user device, and in at least some embodiments may occur in parallel with configuration of an end-user device. For instance, the various notification events discussed above as being communicated to the client device 102 may additionally or alternatively be communicated to one or more of the WAP 106, a network firewall component, a hub, a switch, a router, and so forth, to enable the different components to be configured according to techniques discussed herein.

As discussed above, the different notification events and APIs referenced herein may be communicated separately from data packets of a communication session. Thus, the notification events may be considered as out-of-band communications with regard to communication sessions. In at least some embodiments, this enables devices to be configured and reconfigured for a communication session without interfering with the communication session itself, e.g., independent of a flow of data packets for the communication session.

Having discussed some example procedures, consider now a discussion of an example system and device in accordance with one or more embodiments.

Example System and Device

Figure 9:
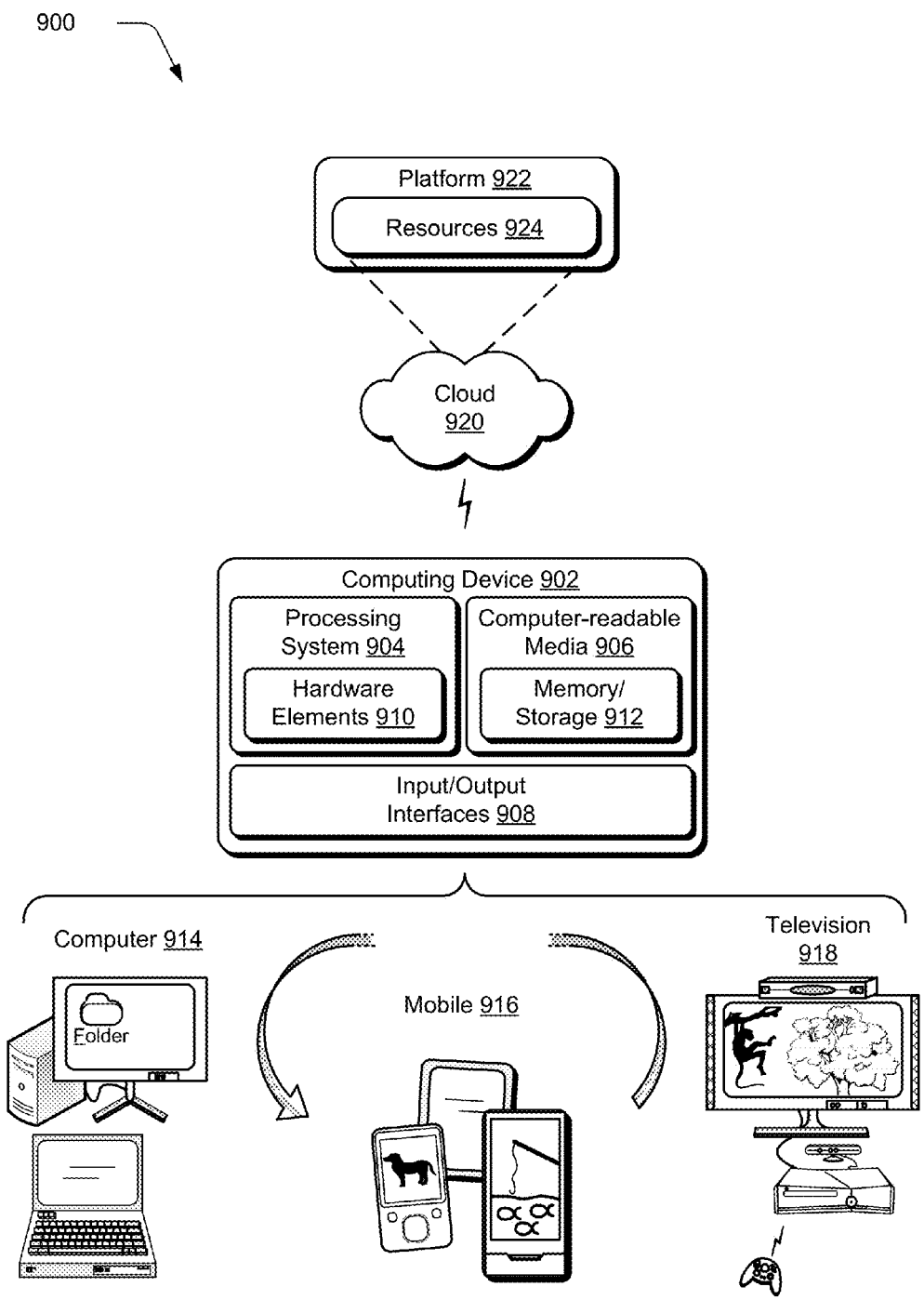
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102, the communication service 116, and/or the network controller 120 discussed above can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the communication service 116, the communication application 112, and/or the network controller 120 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for session-based device configuration are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
    at least one processor; and
    one or more computer-readable storage media including instructions stored thereon that, responsive to execution by the at least one processor, cause the system perform operations including:
        receiving a notification that a communication session is initiated in a network, the notification including a session notification application programming interface (API) that includes a value for an attribute of the communication session;
        ascertaining that a client device is connected to the network based on the attribute of the communication session received as part of the session notification API;
        applying the attribute of the communication session received as part of the session notification API to a network policy for the network to specify a parameter for the communication session;
        configuring a session configuration application programming interface (API) with the parameter for the communication session by applying the value for the attribute included in the session notification API to the network policy;
        generating a configuration event that includes the session configuration API configured with the parameter for the communication session; and
        communicating the configuration event to the client device.

2. The system as recited in claim 1, wherein the notification is separate from data packets of the communication session.

3. The system as recited in claim 1, wherein the attribute includes an identifier for the client device.

4. The system as recited in claim 1, wherein the attribute includes one or more media types for the communication session.

5. The system as recited in claim 1, wherein the session notification API further includes multiple attributes of the communication session.

6. The system as recited in claim 1, wherein the parameter for the communication session specifies a wireless behavior to be applied by the client device.

7. The system as recited in claim 1, wherein the parameter for the communication session specifies a quality of service marking to be applied by the client device to data packets of the communication session.

8. The system as recited in claim 1, the operations further including:
receiving an indication of a change in the communication session;
generating a reconfiguration event that includes at least one of a change to the parameter for the communication session or a change to a different parameter for the communication session; and
communicating the reconfiguration event to the client device.

9. The system as recited in claim 8, wherein the indication of the change includes an indication of a problem with session quality for the communication session, and wherein at least one of the change to the parameter for the communication session or the change to the different parameter is specified to increase the session quality for the communication session.

10. The system as recited in claim 8, wherein the indication of the change includes an indication that the client device is moving to a different location, and wherein at least one of the change to the parameter for the communication session or the change to the different parameter identifies a wireless access point that is available to provide wireless connectivity at the different location.

11. The system as recited in claim 8, wherein the indication of the change includes an indication that the communication session is terminated, and wherein at least one of the change to the parameter for the communication session or the change to the different parameter includes an indication that the communication session is terminated.

12. The system as recited in claim 1, wherein the session notification API is configured to identify dialogue events and session events, and populate the dialogue events and session events with respective values for the communication session.

13. A computer-implemented method comprising:
receiving a notification that a communication session is initiated in a network, the notification including a session notification application programming interface (API) that includes a value for an attribute of the communication session;
ascertaining that a client device is connected to the network based on the attribute of the communication session received as part of the session notification API;
applying the attribute of the communication session received as part of the session notification API to a network policy for the network to specify a parameter for the communication session;
configuring a session configuration application programming interface (API) with the parameter for the communication session by applying the value for the attribute included in the session notification API to the network policy;
generating a configuration event that includes the session configuration API configured with the parameter for the communication session; and
communicating the configuration event to the client device.

14. The method as recited in claim 13, wherein the parameter for the communication session specifies a wireless behavior to be applied by the client device.

15. The method as recited in claim 13, further comprising:
receiving an indication of a change in the communication session;
generating a reconfiguration event that includes at least one of a change to the parameter for the communication session or a change to a different parameter for the communication session; and
communicating the reconfiguration event to the client device.

16. The method as recited in claim 15, wherein the indication of the change includes an indication of a problem with session quality for the communication session, and wherein at least one of the change to the parameter for the communication session or the change to the different parameter is specified to increase the session quality for the communication session.

17. A method comprising:
receiving an update event including an indication of a change to a communication session in a network between a client device and at least one other device, the update event further including a session update application programming interface (API) that includes a value for an attribute of the communication session;
ascertaining that the change has occurred in the communication session based on the attribute of the communication session received as part of the session update API;
applying the attribute of the communication session received as part of the session update API to a network policy for the network to specify a parameter for the communication session;
configuring a reconfiguration application programming interface (API) with the parameter for the communication session by applying the value for the attribute included in the session update API to the network policy;
generating a reconfiguration event that includes the reconfiguration API configured with the parameter for the communication session; and
communicating the reconfiguration event to the client device.

18. The method of claim 17, wherein the indication of the change includes an indication of a problem with session quality for the communication session, and wherein the parameter for the communication session is specified to increase the session quality for the communication session.

19. The method of claim 17, wherein the indication of the change includes an indication that the client device is moving to a different location, and wherein the parameter for the communication session identifies a wireless access point that is available to provide wireless connectivity at the different location.

20. The method of claim 17, wherein the indication of the change includes an indication that the communication session is terminated, and wherein the change to the parameter for the communication session includes an indication that the communication session is terminated.

* * * * *